United States Patent
Yoshida et al.

(10) Patent No.: US 10,221,292 B2
(45) Date of Patent: Mar. 5, 2019

(54) POLYPROPYLENE RESIN FOAMED PARTICLES, IN-MOLD FOAM MOLDED BODY OF POLYPROPYLENE RESIN, AND METHOD FOR MANUFACTURING SAME

(71) Applicant: Kaneka Corporation, Osaka (JP)

(72) Inventors: Toru Yoshida, Osaka (JP); Shintaro Miura, Osaka (JP)

(73) Assignee: KANEKA CORPORATION, Osaka (JP)

( * ) Notice: Subject to any disclaimer, the term of this patent is extended or adjusted under 35 U.S.C. 154(b) by 0 days.

(21) Appl. No.: 15/910,652

(22) Filed: Mar. 2, 2018

(65) Prior Publication Data

US 2018/0186959 A1 Jul. 5, 2018

Related U.S. Application Data

(60) Division of application No. 15/487,122, filed on Apr. 13, 2017, now abandoned, which is a continuation of application No. PCT/JP2015/079035, filed on Oct. 14, 2015.

(30) Foreign Application Priority Data

Oct. 15, 2014  (JP) .................. 2014-210753

(51) Int. Cl.
| | |
|---|---|
| *C08J 9/18* | (2006.01) |
| *C08J 9/232* | (2006.01) |
| *C08L 23/14* | (2006.01) |
| *C08L 23/16* | (2006.01) |
| *C08J 9/00* | (2006.01) |
| *C08J 9/224* | (2006.01) |
| *B29C 44/02* | (2006.01) |
| *B29K 23/00* | (2006.01) |
| *B29K 105/04* | (2006.01) |
| *B29K 105/00* | (2006.01) |
| *B29C 44/34* | (2006.01) |
| *B29C 44/44* | (2006.01) |

(52) U.S. Cl.
CPC .............. *C08J 9/18* (2013.01); *C08J 9/0061* (2013.01); *C08J 9/224* (2013.01); *C08J 9/232* (2013.01); *C08L 23/14* (2013.01); *C08L 23/16* (2013.01); *B29C 44/02* (2013.01); *B29C 44/3461* (2013.01); *B29C 44/445* (2013.01); *B29K 2023/12* (2013.01); *B29K 2105/0014* (2013.01); *B29K 2105/041* (2013.01); *B29K 2105/048* (2013.01); *B29K 2995/0063* (2013.01); *C08J 2201/03* (2013.01); *C08J 2203/06* (2013.01); *C08J 2205/04* (2013.01); *C08J 2323/14* (2013.01); *C08J 2423/14* (2013.01); *C08J 2423/16* (2013.01); *C08L 2314/02* (2013.01)

(58) Field of Classification Search
CPC combination set(s) only.
See application file for complete search history.

(56) References Cited

U.S. PATENT DOCUMENTS

| | | |
|---|---|---|
| 4,908,393 A | 3/1990 | Arai et al. |
| 5,032,620 A | 7/1991 | Arai et al. |
| 2004/0249004 A1 | 12/2004 | Coppini et al. |
| 2005/0113473 A1 | 5/2005 | Wada |
| 2008/0039588 A1* | 2/2008 | Shibata ............... C08J 9/0061 525/240 |
| 2009/0156700 A1 | 6/2009 | Oikawa et al. |
| 2010/0105787 A1 | 4/2010 | Sasaki et al. |
| 2010/0137466 A1 | 6/2010 | Sasaki et al. |
| 2012/0100376 A1 | 4/2012 | Sakaguchi et al. |
| 2014/0346411 A1* | 11/2014 | Miura ..................... C08J 9/16 252/511 |

FOREIGN PATENT DOCUMENTS

| | | |
|---|---|---|
| CN | 103509203 A | 1/2014 |
| JP | 12-158441 A | 6/1990 |
| JP | H10-251437 A | 9/1998 |
| JP | 2004-68016 A | 3/2004 |

(Continued)

OTHER PUBLICATIONS

International Search Report issued in International Application No. PCT/JP2015/079035; dated Jan. 19, 2016 (2 pages).
International Preliminary Report on Patentability issued in International Application No. PCT/JP2015/079035; dated Apr. 27, 2017 (10 pages).
Office Action issued in U.S. Appl. No. 15/487,122; dated Jul. 17, 2017 (16 pages).
Office Action issued in U.S. Appl. No. 15/487,122; dated Dec. 5, 2017 (8 pages).

*Primary Examiner* — Kara B Boyle
(74) *Attorney, Agent, or Firm* — Osha Liang LLP

(57) ABSTRACT

A method of producing a polypropylene resin in-mold expanded product, includes: placing polypropylene resin particles obtained from a base material resin having a melting point of 140° C. to 150° C., the base material resin comprising: a polypropylene resin A comprising 3 weight % to 15 weight % of 1-butene and having a melting point of 130° C. to 140° C.; and a polypropylene resin B having a melting point of 145° C. to 165° C., water, and an inorganic gas foaming agent in a pressure-resistant container, forming a mixture, dispersing the polypropylene resin particles while stirring the mixture, obtaining a dispersion liquid, increasing a temperature and a pressure in the pressure-resistant container, releasing the dispersion liquid from the pressure-resistant container into a region having a pressure lower than the pressure in the pressure-resistant container, producing expanded polypropylene resin particles; and filling a mold with the expanded polypropylene resin particles, and then heating the expanded polypropylene resin particles.

6 Claims, 2 Drawing Sheets

(56) References Cited

FOREIGN PATENT DOCUMENTS

| | | | | |
|---|---|---|---|---|
| JP | 2004-176047 | A | | 6/2004 |
| JP | 2004176047 | A | * | 6/2004 |
| JP | 2005-506429 | A | | 3/2005 |
| JP | 2006-096805 | A | | 4/2006 |
| JP | 2008-106150 | A | | 5/2008 |
| JP | 2009-144096 | A | | 7/2009 |
| JP | 2010-144078 | A | | 7/2010 |
| JP | 2010248341 | A | | 11/2010 |
| WO | 2006/054727 | A1 | | 5/2006 |
| WO | 2008/139822 | A1 | | 11/2008 |
| WO | 2009/001626 | A1 | | 12/2008 |
| WO | 2009/051035 | A1 | | 4/2009 |
| WO | 2010/150466 | A1 | | 12/2010 |
| WO | 2013094529 | A1 | | 6/2013 |

* cited by examiner

DSC CURVE OF EXPANDED POLYPROPYLENE RESIN PARTICLES

POLYPROPYLENE RESIN FOAMED PARTICLES, IN-MOLD FOAM MOLDED BODY OF POLYPROPYLENE RESIN, AND METHOD FOR MANUFACTURING SAME

The present application is a divisional application of U.S. patent application Ser. No. 15/487,122, filed on Apr. 13, 2017, which is a continuation application of International Application No. PCT/JP2015/079035 filed Oct. 14, 2015, which claims priority to Japanese Patent Application No. 2014-210753 filed on Oct. 15, 2014, the whole content of these applications being herein incorporated by reference for all purposes.

TECHNICAL FIELD

One or more embodiments of the present invention relate to (i) an expanded polypropylene resin particle, (ii) a polypropylene resin in-mold expanded molded product obtained from expanded polypropylene resin particles, (iii) a method of producing the expanded polypropylene resin particle, and (iv) a method of producing the polypropylene resin in-mold expanded molded product.

BACKGROUND

A polypropylene resin in-mold expanded molded product, which is obtained with the use of expanded polypropylene resin particles obtained from a polypropylene resin, has characteristics such as being easily shaped, being light in weight, and being heat insulating, which are advantages of an in-mold expanded molded product. In comparison with a polystyrene resin in-mold expanded molded product which is obtained with the use of expanded polystyrene resin particles, a polypropylene resin in-mold expanded molded product is superior in terms of chemical resistance, heat resistance, strain recovery rate after compression, and the like. In comparison with a polyethylene resin in-mold expanded molded product which is obtained with the use of expanded polyethylene resin particles, a polypropylene resin in-mold expanded molded product is superior in terms of dimension accuracy, heat resistance, compressive strength, and the like. Because of these characteristics, a polypropylene resin in-mold expanded molded product is put to a wide range of use such as not only automobile interior materials and automobile bumper core materials but also heat insulating materials, shock-absorbing packing materials, and returnable containers.

As described above, a polypropylene resin in-mold expanded molded product is superior to a polyethylene resin in-mold expanded molded product in terms of heat resistance and compressive strength. However, with a polypropylene resin in-mold expanded molded product, a molding temperature during in-mold foaming molding becomes high. Therefore, a high steam pressure is necessary during, for example, in-mold foaming molding with the use of steam. This tends to cause utility costs to be high.

Certain techniques have been proposed, examples of which encompass: (i) techniques in which a low-melting polypropylene resin having a melting point of 140° C. or lower is used (e.g. Patent Literature 1), (ii) techniques in which a mixture of a low-melting polypropylene resin and a high-melting polypropylene resin is used (e.g. Patent Literatures 2 and 4-8), and (iii) techniques in which a low-melting metallocene polypropylene resin, which is polymerized by use of a metallocene catalyst, is used (e.g. Patent Literature 3). In addition to the literatures above, Patent Literatures 11 and 12 can be listed as literatures each of which discloses a technique for producing an expanded polypropylene resin particle that is excellent in characteristics such as heat resistance.

However, even though a molding temperature can be reduced with these techniques, the amount of decrease in compressive strength is excessively large in comparison with conventional in-mold expanded molded products. Specifically, for example, in a case where a polypropylene resin in-mold expanded molded product for an automobile bumper has a density of 30 g/L, a strength of approximately 0.23 MPa is required as compressive strength when the polypropylene resin in-mold expanded molded product is strained by 50% (hereinafter referred to as "50%-strained compressive strength"). With conventional technologies, a pressure of 0.26 MPa (gage pressure) or more (i.e. high molding temperature) as in-mold foaming molding pressure is necessary in order to obtain polypropylene resin in-mold expanded molded product having the strength above.

Meanwhile, in a case where (i) a low-melting polypropylene resin is used, (ii) a mixture of a low-melting polypropylene resin and a high-melting polypropylene resin is used, or (iii) a metallocene polypropylene resin, which is polymerized by use of a metallocene catalyst, is used, an in-mold expanded molded product can be molded at an in-mold foaming molding pressure of 0.20 MPa (gage pressure) or less. However, a 50%-strained compressive strength becomes considerably below 0.23 MPa. The decrease in compressive strength in a case where a polypropylene resin can be molded with such low molding pressure (low molding temperature) is remarkable when density of a molded product is 40 g/L or less.

A metallocene polypropylene resin poses a high production costs in comparison with a Ziegler polypropylene resin which is polymerized with the use of a Ziegler catalyst. Therefore, even if utility costs of in-mold foaming molding can be reduced as a result of a low molding temperature, material costs are still high. This is not necessarily advantageous from an industrial perspective.

Under the circumstances, there are still demands for a technique for achieving a high-compressive-strength polypropylene resin in-mold expanded molded product while a molding temperature during in-mold foaming molding is reduced.

As examples of a technique in which a molding temperature during in-mold foaming molding is lowered (i.e. molding at low steam pressure is enabled), there are known techniques of using expanded composite particles each including an expanded polypropylene resin core layer and a polypropylene resin covering layer that covers the polypropylene resin foamed core layer (e.g. Patent Literatures 9-10). However, these techniques tend to cause adhesiveness of an interface between an expanded polypropylene resin core layer and a polypropylene resin covering layer to be weak.

CITATION LIST

Patent Literature

[Patent Literature 1]
PCT International Publication, No. WO2008/139822 (Publication Date: Nov. 20, 2008)
[Patent Literature 2]
PCT International Publication, No. WO2009/001626 (Publication Date: Dec. 31, 2008)

[Patent Literature 3]
Japanese Patent Application Publication, Tokukai, No. 2009-144096 (Publication Date: Jul. 2, 2009)
[Patent Literature 4]
Japanese Patent Application Publication, Tokukai, No. 2010-144078 (Publication Date: Jul. 1, 2010)
[Patent Literature 5]
Chinese Patent Publication, No. CN103509203 (Publication Date: Jan. 15, 2014).
[Patent Literature 6]
PCT International Publication, No. WO2006/054727 (Publication Date: May 26, 2006)
[Patent Literature 7]
PCT International Publication, No. WO2009/051035 (Publication Date: Apr. 23, 2009)
[Patent Literature 8]
Japanese Patent Application Publication, Tokukai, No. 2008-106150 (Publication Date: May 8, 2008)
[Patent Literature 9]
Japanese Patent Application Publication, Tokukai, No. 2004-176047 (Publication Date: Jun. 24, 2004)
[Patent Literature 10]
PCT International Publication, No. WO2010/150466 (Publication Date: Dec. 29, 2010)
[Patent Literature 11]
Japanese Patent Application Publication, Tokukai, No. 2006-096805 (Publication Date: Apr. 13, 2006)
[Patent Literature 12]
Japanese Patent Application Publication, Tokukaihei, No. 10-251437 (Publication Date: Sep. 22, 1998)

SUMMARY

One or more embodiments of the present invention provide a high-compressive-strength polypropylene resin in-mold expanded molded product while a molding temperature (steam pressure) during in-mold foaming molding is reduced.

The inventors of the present invention found that with the use of expanded polypropylene resin particles obtained from a base material resin including (i) a low-melting polypropylene resin having a structure in which a certain amount of certain comonomers is contained and (ii) a polypropylene resin having a melting point higher than that of the low-melting polypropylene resin, it may be possible to reduce a molding temperature during in-mold foaming molding to a low temperature and it may also be possible to maintain, at a level not inferior to those of conventional molded products, a compressive strength of a polypropylene resin in-mold expanded molded product to be obtained.

<1> An expanded polypropylene resin particle which has an average cell diameter of 100 μm or more to 340 μm or less and which is obtained from a base material resin, the base material resin having a melting point of 140° C. or higher to 150° C. or lower and including a polypropylene resin A satisfying the following condition (a) and having a melting point of 130° C. or higher to 140° C. or lower and a polypropylene resin B having a melting point of 145° C. or higher to 165° C. or lower:
(a) a structural unit of 1-butene is present in an amount of 3 weight % or more to 15 weight % or less with respect to 100 weight % entire structural units.

<2> The expanded polypropylene resin particle as set forth in <1>, configured such that the polypropylene resin A further satisfies the following condition (b):

(b) a structural unit of ethylene is present in amount of 2 weight % or more to 10 weight % or less with respect to 100 weight % entire structural units.

<3> The expanded polypropylene resin particle as set forth in <1> or <2>, configured such that: the base material resin includes the polypropylene resin A in an amount of 50 weight % or more to 70 weight % or less and the polypropylene resin B in an amount of 30 weight % or more to 50 weight % or less; and the polypropylene resin A and the polypropylene resin B together account for 100 weight %.

<4> The expanded polypropylene resin particle as set forth in any one of <1> through <3>, configured such that the average cell diameter is 120 μm or more to 250 μm or less.

<5> The expanded polypropylene resin particle as set forth in any one of <1> through <4>, configured such that the melting point of the base material resin is 145° C. or higher to 150° C. or lower.

<6> The expanded polypropylene resin particle as set forth in any one of <1> through <5>, configured such that the melting point of the base material resin is 146° C. or higher to 148° C. or lower.

<7> The expanded polypropylene resin particle as set forth in any one of <1> through <6>, configured such that the polypropylene resin B is a propylene-ethylene random copolymer or a propylene-ethylene-1-butene random copolymer.

<8> The expanded polypropylene resin particle as set forth in any one of <1> through <7>, configured such that the polypropylene resin A is obtained with use of a Ziegler catalyst.

<9> The expanded polypropylene resin particle as set forth in any one of <1> through <8>, configured such that:
the expanded polypropylene resin particle is an expanded composite particle in which an expanded polypropylene resin core layer is covered with a polypropylene resin covering layer
the expanded polypropylene resin core layer is obtained from a base material resin including the polypropylene resin A and the polypropylene resin B; and
the polypropylene resin covering layer includes the polypropylene resin A.

<10> A polypropylene resin in-mold expanded molded product obtained by subjecting, to in-mold foaming molding, expanded polypropylene resin particles recited in any one of <1> through <9>.

<11> The polypropylene resin in-mold expanded molded product as set forth in <10>, configured such that the polypropylene resin in-mold expanded molded product has a density and a 50%-strained compressive strength which are related so as to satisfy the following Formula (1):

[50%-strained compressive strength (MPa)]≥0.0069× [Molded product density (g/L)]+0.018   (1)

<12> The polypropylene resin in-mold expanded molded product as set forth in <10> or <11>, configured such that the polypropylene resin in-mold expanded molded product has a density of 20 g/L or more to 40 g/L or less.

<13> A method of producing a polypropylene resin in-mold expanded molded product, including the steps of:
(A) obtaining expanded polypropylene resin particles each having an average cell diameter of 100 μm or more to 340 μm or less, the expanded polypropylene resin particles being obtained by
(i) placing polypropylene resin particles, water, and an inorganic gas foaming agent in a pressure-resistant container, so that a mixture is obtained, the polypropylene resin particles having been obtained from a base material resin, the base material resin having a melting point of 140° C. or higher to 150° C. or lower and including a polypropylene resin A satisfying the following condition (a) and having a melting point of 130° C. or higher to 140° C. or lower and a polypropylene resin B having a melting point of 145° C. or higher to 165° C. or lower, (ii) dispersing the polypropylene resin particles while the mixture is stirred, so that a dispersion liquid is obtained, (iii) increasing a temperature and a pressure in the pressure-resistant container, and then (iv) releasing the dispersion liquid from the pressure-resistant container into a region having a pressure lower than an internal pressure of the pressure-resistant container, so that the polypropylene resin particles are foamed; and (B) obtaining the polypropylene resin in-mold expanded molded product by (i) filling a mold with the expanded polypropylene resin particles, and then (ii) heating the expanded polypropylene resin particles:

(a) a structural unit of 1-butene is present in an amount of 3 weight % or more to 15 weight % or less with respect to 100 weight % entire structural units.

<14> The method as set forth in <13>, configured such that the polypropylene resin A satisfies the following condition (b):

(b) a structural unit of ethylene is present in amount of 2 weight % or more to 10 weight % or less with respect to 100 weight % entire structural units.

<15> The method as set forth in <13> or <14>, further including the step of: melting and kneading the polypropylene resin A and the polypropylene resin B in an extruder and then obtaining the polypropylene resin particles.

<16> The method as set forth in any one of <13> through <15>, further including the step of: obtaining the polypropylene resin A by carrying out polymerization with use of a Ziegler catalyst.

<17> The method as set forth in any one of <13> through <16>, configured such that:

the expanded polypropylene resin particles are each an expanded composite particle in which an expanded polypropylene resin core layer is covered with a polypropylene resin covering layer;

the expanded polypropylene resin core layer is obtained from a base material resin including the polypropylene resin A and the polypropylene resin B; and the polypropylene resin covering layer includes the polypropylene resin A.

<18> The method as set forth in any one of <13> through <17>, configured such that in the step (B), the expanded polypropylene resin particles are heated with use of steam having a pressure of 0.22 MPa (gage pressure) or less and the polypropylene resin in-mold expanded molded product has a density and a 50%-strained compressive strength which are related so as to satisfy the following Formula (1):

$$[50\%\text{-strained compressive strength (MPa)}] \geq 0.0069 \times [\text{Molded product density (g/L)}] + 0.018 \quad (1)$$

According to one or more embodiments of the present invention, it is possible to (i) reduce a molding temperature during in-mold foaming molding to a low temperature and (ii) maintain, at a level not inferior to those of conventional molded products, a compressive strength of a polypropylene resin in-mold expanded molded product to be obtained.

DESCRIPTION OF EMBODIMENTS

Figure 1:
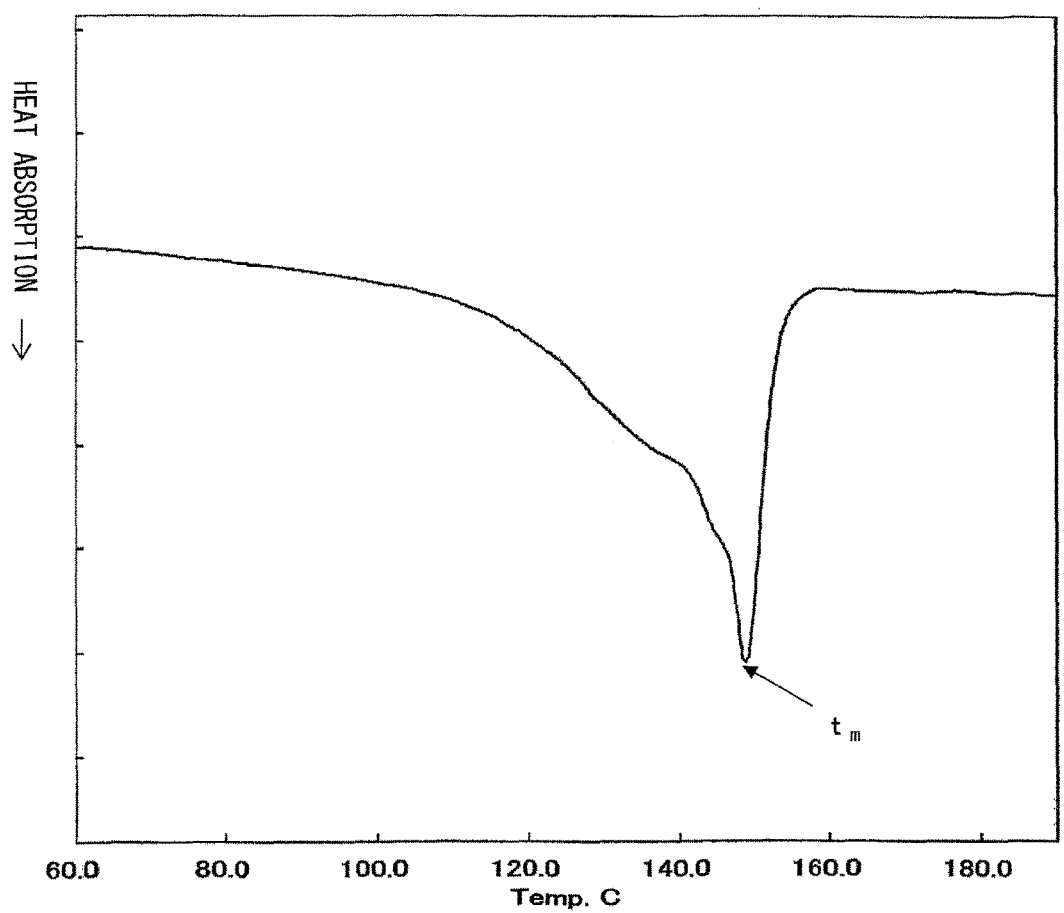
FIG. 1 is a view illustrating a DSC curve of second temperature rise obtained when, in differential scanning calorimetry (DSC), (i) a temperature of a polypropylene resin is raised from 40° C. to 220° C. at a heating rate of 10° C./min, (ii) the temperature is cooled from 220° C. to 40° C. at a rate of 10° C./min, and (iii) the temperature is raised again from 40° C. to 220° C. at a rate of 10° C./min $t_m$ is a melting point.

The following description will discuss one or more embodiments of the present invention. However, the present invention is not limited to these embodiments. The present invention is not limited to any of configurations described below, but can be altered in many ways within the scope of the claims. An embodiment and/or an example derived from a proper combination of technical means disclosed in different embodiments and/or examples are/is also encompassed in the technical scope of the present invention. In addition, all of the academic documents and patent literature listed herein are incorporated by reference herein.

In one or more embodiments of the present invention, the expanded polypropylene resin particles is obtained from a base material resin containing a polypropylene resin A and a polypropylene resin B.

The polypropylene resin A used in one or more embodiments of the present invention is a polypropylene resin which satisfies the following condition (a) and which has a melting point in a range of 130° C. or higher to 140° C. or lower:

(a) a structural unit(s) of 1-butene is present in an amount of 3 weight % or more to 15 weight % or less with respect to 100 weight % entire structural units.

The polypropylene resin A used in one or more embodiments of the present invention has a structural unit(s) of 1-butene in an amount of 3 weight % or more to 15 weight % or less with respect to 100 weight % entire structural units. If a structural unit of 1-butene is less than 3 weight %, then a molding temperature during in-mold foaming molding tends not to decrease. If a structural unit of 1-butene is more than 15 weight %, then a compressive strength of an in-mold expanded molded product to be obtained tends to decrease.

The polypropylene resin A can contain, in addition to 1-butene, a structural unit of a comonomer which is copolymerizable with propylene. Examples of the comonomer encompass at least one type of α-olefin, such as ethylene, 1-pentene, 1-hexene, and 4-methyl-1-butene, any of which has 2 carbon atoms or any of 4 carbon atoms through 12 carbon atoms. Among these, the comonomer may be ethylene.

The polypropylene resin A may further satisfy the following condition (b) in regard to ethylene.

(b) A structural unit of ethylene is present in amount of 2 weight % or more to 10 weight % or less with respect to 100 weight % entire structural units.

The polypropylene resin A may satisfy both the condition (a) and condition (b), because, with such a polypropylene resin A, (i) a molding temperature during in-mold foaming molding can be easily made low and (ii) compressive strength of an in-mold expanded molded product to be obtained does not decrease but can be kept high. Note that "100 weight % entire structural units" means that the sum of a structural unit obtained from propylene, a structural unit obtained from 1-butene, and a structural unit obtained from another/other comonomer(s) such as ethylene accounts for 100 weight %.

Hence, the polypropylene resin A may be at least one selected from the group consisting of (i) a propylene-1-butene random copolymer and (ii) a propylene-ethylene-1-butene random copolymer. In addition, the polypropylene resin A may (i) have a structural unit obtained from 1-butene in an amount of 4 weight % or more to 9 weight % or less and/or (ii) have a structural unit obtained from ethylene in an amount of 2.5 weight % or more to 6 weight % or less.

The polypropylene resin A may have a melting point of 130° C. or higher to 140° C. or lower, such as 132° C. or higher to 138° C. or lower, or such as 134° C. or higher to 138° C. or lower. If the melting point of the polypropylene resin A is lower than 130° C., then compressive strength of an in-mold expanded molded product to be obtained tends to decrease. If the melting point is more than 140° C., then a molding temperature during in-mold foaming molding tends not to decrease.

A catalyst for use in polymerization of the polypropylene resin A in accordance with one or more embodiments of the present invention is not limited to any particular one. Examples of the catalyst encompass a Ziegler catalyst and metallocene catalyst.

In general, in comparison with a polypropylene resin polymerized with the use of a metallocene catalyst (hereinafter also referred to as "metallocene polypropylene resin"), a polypropylene resin polymerized with the use of a Ziegler catalyst (hereinafter also referred to as "Ziegler polypropylene resin") has lower rigidity by melting point matching. Specifically, a comparison of rigidity of a Ziegler polypropylene resin and rigidity of a metallocene polypropylene resin having an identical melting point shows that the rigidity of the Ziegler polypropylene resin is lower. Therefore, the use of a Ziegler catalyst may conventionally be disadvantageous in order to obtain (i) reducing a molding temperature during in-mold foaming molding to a low temperature and (ii) maintaining compressive strength of a polypropylene resin in-mold expanded molded product to be obtained. However, with one or more embodiments of the present invention in which not only the condition (a) but also the condition (b) are defined, it may be possible to easily obtain the product according to one or more embodiments of the present invention, even in a case where a polypropylene resin polymerized with the use of a Ziegler catalyst is used.

That is, it is possible to use a polypropylene resin A which is polymerized with the use of a Ziegler catalyst. A polypropylene resin polymerized with the use of a Ziegler catalyst may also be used in view of the fact that (i) such a polypropylene resin is industrially more available than a polypropylene resin polymerized with the use of a metallocene catalyst and (ii) such a polypropylene resin can be put to a wider range of use.

Although usable also as a polypropylene resin B described later, a polypropylene resin polymerized with the use of a Ziegler catalyst may be used in one or more embodiments of the present invention by being used as a polypropylene resin A.

Examples of the polypropylene resin B used in one or more embodiments of the present invention encompass (i) a propylene homopolymer and (ii) a copolymer including: propylene; and a comonomer which is copolymerizable with propylene.

The polypropylene resin B may be a copolymer including propylene and a comonomer copolymerizable with the propylene in view of the fact that such a polypropylene resin B allows a molding temperature during in-mold foaming molding to be easily made low. Examples of such a comonomer which is copolymerizable with propylene encompass α-olefin, such as ethylene, 1-butene, 1-pentene, 1-hexene, and 4-methyl-1-butene, any of which has 2 carbon atoms or any of 4 carbon atoms through 12 carbon atoms. Among these, ethylene may be used. These comonomers can be individually copolymerized with propylene, or these comonomers in combination can be copolymerized with propylene.

The polypropylene resin B may be a propylene-ethylene random copolymer or a propylene-ethylene-1-butene random copolymer in view of the fact that such a polypropylene resin B allows a molding temperature during in-mold foaming molding to be easily made low and makes it possible to maintain high compressive strength of an in-mold expanded molded product to be obtained without causing the compressive strength to decrease.

A melting point of the polypropylene resin B in accordance with one or more embodiments of the present invention may be 145° C. or higher to 165° C. or lower, such as 147° C. or higher to 160° C. or lower, or such as 148° C. or higher to 153° C. or lower. If the melting point of the polypropylene resin B is lower than 145° C., then compressive strength of an in-mold expanded molded product to be obtained tends to decrease. If the melting point is more than 165° C., then a molding temperature during in-mold foaming molding tends to be high.

A catalyst for use in polymerization of the polypropylene resin B is not limited to any particular one. Examples of the catalyst encompass a Ziegler catalyst and metallocene catalyst. Note, however, that a polypropylene resin B polymerized with the use of a Ziegler catalyst may be used in view of the fact that such as polypropylene resin B is easily available industrially and can be put to a wider range of use.

A melt flow rate (hereinafter referred to as "MFR") of each of the polypropylene resin A and the polypropylene resin B is not particularly limited, but may be more than 3 g/10 min and less than 10 g/10 min., such as 5 g/10 min or more to 9 g/10 min or less.

If the MFR of each of the polypropylene resin A and polypropylene resin B is more than 3 g/10 min and less than 10 g/10 min, then (i) an in-mold expanded molded product tends to have a good surface appearance and (ii) a molding cycle during molding tends to be short. Note that the MFR of the polypropylene resin according to one or more embodiments of the present invention is measured with the use of an MFR measuring instrument described in JIS-K7210 and under conditions involving (i) an orifice having a diameter of 2.0959±0.005 mm and a length of 8.000±0.025 mm, (ii) a load of 2160 g, and (iii) a temperature of 230° C.±0.2° C.

In one or more embodiments of the present invention, a ratio at which the polypropylene resin A and the polypropylene resin B are mixed is not particularly limited. Note, however, that in view of allowing a molding temperature during in-mold foaming molding to be easily made low and maintaining high compressive strength of an in-mold expanded molded product to be obtained without causing the compressive strength to decrease, it may be possible to mix the polypropylene resin A and the polypropylene resin B such that the polypropylene resin A accounts for 50 weight % or more to 70 weight % or less and the polypropylene resin B accounts for 30 weight % or more to 50 weight % or less with respect to a total amount of both the polypropylene resins as 100 weight %.

In one or more embodiments of the present invention, it is possible to use an additive as necessary in addition to the polypropylene resin A and the polypropylene resin B. Examples of the additive encompass: a resin other than a polypropylene resin (described later); an expansion nucleating agent; a hydrophilic compound; a colorant; an antistatic agent; a flame retarder; an antioxidant; and electrically conductive agent. In such a case, a base material resin is constituted by a mixture of the polypropylene resin A, the polypropylene resin B, and the additive.

Examples of other resins which can be mixed encompass polyethylene resins such as a high-density polyethylene resin, a medium-density polyethylene resin, a low-density polyethylene resin, and a linear low-density polyethylene resin. In a case where the polyethylene resin is to be mixed, mixing equal to or less than 20 parts by weight of the polyethylene resin in 100 parts by weight of the polypropylene resin A and the polypropylene resin B combined may (i) allow an expansion ratio to easily increase or (ii) allow a molding temperature during in-mold foaming molding to be easily made low.

In one or more embodiments of the present invention, it may be possible to add, to a base material resin, an expansion nucleating agent which is to become an expansion nucleus during expansion of the base material resin. Specific examples of the expansion nucleating agent for use in one or more embodiments of the present invention encompass silica (silicon dioxide), silicate, alumina, diatomaceous earth, calcium carbonate, magnesium carbonate, calcium phosphate, feldspar, apatite, and barium sulfate. Examples of silicate encompass talc, magnesium silicate, kaolin, halloysite, dickite, aluminum silicate, and zeolite. These expansion nucleating agents can be used individually or in combination.

In view of uniformity of cell diameters, an amount of the expansion nucleating agent contained in the base material resin used in one or more embodiments of the present invention may be equal to or greater than 0.005 parts by weight and equal to or less than 2 parts by weight, such as equal to or greater than 0.01 parts by weight and equal to or less than 1 part by weight, or such as equal to or greater than 0.03 parts by weight and equal to or less than 0.5 parts by weight with respect to 100 parts by weight of the polypropylene resin A and the polypropylene resin B combined.

Adding a hydrophilic compound to a base material resin may bring about the effect of promoting an increase in expansion ratio of expanded polypropylene resin particles.

Specific examples of a hydrophilic compound for use in one or more embodiments of the present invention encompass water-absorbing organic matters such as glycerin, polyethylene glycol, glycerin fatty acid ester, melamine, isocyanuric acid, and a melamine-isocyanuric acid condensate.

An amount of the hydrophilic compound contained in the base material resin in accordance with one or more embodiments of the present invention may be equal to or greater than 0.01 parts by weight and equal to or less than 5 parts by weight, such as equal to or greater than 0.1 parts by weight and equal to or less than 2 parts by weight with respect to 100 parts by weight of the polypropylene resin A and the polypropylene resin B combined. If the amount of the hydrophilic compound contained is less than 0.01 parts by weight, then the effect of increasing an expansion ratio and the effect of enlarging a cell diameter are difficult to be obtained. If the amount of the hydrophilic compound contained is more than 5 parts by weight, then the hydrophilic compound becomes unlikely to be uniformly dispersed in a polypropylene resin.

Examples of the colorant encompass carbon black, ultramarine blue, cyanine pigment, azo pigment, quinacridone pigment cadmium yellow, chrome oxide, iron oxide, perylene pigment, and Anthraquinone pigment. These colorants can be used individually or in combination.

An amount of the colorant contained in the base material resin may be equal to or greater than 0.001 parts by weight and equal to or less than 10 parts by weight, such as equal to or greater than 0.01 parts by weight and equal to or less than 8 parts by weight with respect to 100 parts by weight of the polypropylene resin A and the polypropylene resin B combined. In a case where blackening is intended with the use of carbon black, in particular, the carbon black may be equal to or greater than 1 part by weight and equal to or less than 10 parts by weight with respect to 100 parts by weight of the polypropylene resin A and the polypropylene resin B combined.

In one or more embodiments of the present invention, a melting point of the base material resin including the polypropylene resin A and the polypropylene resin B is approximately 130° C. or higher to 165° C. or lower, based on the respective melting points of the polypropylene resin A and of the polypropylene resin B. In view of allowing a molding temperature during in-mold foaming molding to be easily made low and maintaining high compressive strength of an in-mold expanded molded product to be obtained without causing the compressive strength to decrease, the melting point of the base material resin may be 140° C. or higher to 150° C. or lower, such as 145° C. or higher to 150° C. or lower, such as 145° C. or higher to 149° C. or lower, such as 145° C. or higher to 148° C. or lower, or such as 146° C. or higher to 148° C. or lower.

Note that, as illustrated in FIG. 1, a melting point $t_m$ of a polypropylene resin (polypropylene resin A, polypropylene resin B, or base material resin) is a melting peak temperature in a second temperature rise ($t_m$ in FIG. 1) in a DSC curve which is obtained when, in differential scanning calorimetry (DSC), 1 mg or more to 10 mg or less of polypropylene resin is (i) heated from 40° C. to 220° C. at a heating rate of 10° C./min., (ii) cooled from 220° C. to 40° C. at a cooling rate of 10° C./min, and then (iii) heated again from 40° C. to 220° C. at a heating rate of 10° C./min.

FIG. 1 shows an example in which a single melting peak appears. Note, however, that in a case where a plurality of resins are mixed, a plurality of melting peaks may appear. For example, as described earlier, a resin other than a polypropylene resin can be mixed in one or more embodiments of the present invention. In such a case, if a polyethylene resin is mixed in a high-melting polypropylene resin such as the polypropylene resin B, then not only the single melting peak in FIG. 1 but also a melting peak (or shoulder) based on the polyethylene resin may appear around, for example, 130° C. That is, the total of two melting peaks may appear. In a case where a plurality of melting peaks appear in a DSC curve in a second temperature rise, a temperature of a melting peak having a largest heat absorption quantity may be used as a melting point $t_m$.

Examples of a method of mixing the polypropylene resin A and the polypropylene resin B encompass (i) a method in which the polypropylene resin A and the polypropylene resin B are mixed with the use of a blender or an extruder and (ii) a method in which the polypropylene resin A and the polypropylene resin B are blended by multi-stage polymerization during polymerization. Note that the method in which a blender or an extruder is used can also be used as a method of mixing the additive in the polypropylene resin. Note also that the additive can be directly added to the polypropylene resin. Alternatively, it is possible to (i) prepare a masterbatch by including, at a high concentration, the additive in another resin and then (ii) add the masterbatch to the polypropylene resin.

A resin to be used for production of a masterbatch may be a polyolefin resin, such as the polypropylene resin A and/or the polypropylene resin B, or such as a mixture of the polypropylene resin A and the polypropylene resin B.

As described later, expanded polypropylene resin particles may be expanded composite particles obtained by covering an expanded polypropylene resin core layer with a polypropylene resin covering layer because, with such expanded polypropylene resin particles, (i) a molding temperature in a case of obtaining a polypropylene resin in-mold expanded molded product to can be made lower and (ii) high compressive strength of the polypropylene resin in-mold expanded molded product can be maintained.

Among such expanded composite particles, (i) a resin of an expanded polypropylene resin core layer is made of a base material resin containing a polypropylene resin A and a polypropylene resin B and (ii) a polypropylene resin covering layer is made of a polypropylene resin A may be used. This is because, with such expanded composite particles, (i) adhesiveness of an interface between the expanded polypropylene resin core layer and the polypropylene resin covering layer can increase and (ii) fusibility of an in-mold expanded molded product can easily be good.

With conventional expanded composite particles, fusibility between the expanded composite particles during in-mold foaming molding is increased. However, the conventional expanded composite particles tend to cause adhesiveness of an interface between an expanded polypropylene resin core layer and a polypropylene resin covering layer to be weak. In one or more embodiments of the present invention, adhesiveness of an interface between an expanded polypropylene resin core layer and a polypropylene resin covering layer tends to improve.

Such a characteristic is assumed to be derived from the following considerations: (i) Since a polypropylene resin A included in the expanded polypropylene resin core layer and a polypropylene resin A included in the polypropylene resin covering layer are identical polypropylene resins, adhesive strength of an interface between the expanded polypropylene resin core layer and the polypropylene resin covering layer becomes strong; and (ii) Since the polypropylene resin covering layer is made of a low-melting polypropylene resin A, expanded composite particles can be fused to each other at a lower molding temperature.

In production of expanded polypropylene resin particles in accordance with one or more embodiments of the present invention, a step (granulation step) of producing polypropylene resin particles, which are made of a base material resin, can be first carried out.

Examples of the method of producing polypropylene resin particles encompass a method in which an extruder is used. Specifically, it is possible, for example, that (i) a polypropylene resin A, a polypropylene resin B, and, as necessary, an additive (e.g. another resin, an expansion nucleating agent, a hydrophilic compound, and a colorant) are blended, so that a blended product is obtained, (ii) the blended product is introduced into an extruder and is melted and kneaded, (iii) a resultant product is extruded through a die provided at a tip of the extruder, and is then allowed to pass through water so as to be cooled, and (iv) the resultant product is chopped with the use of a cutter, so that polypropylene resin particles each having a desired shape, such as a columnar shape, an ellipsoidal shape, a spherical shape, a cubic shape, and a rectangular parallelepiped shape, are obtained. Alternatively, it is possible to (i) directly extrude the resultant product through the die into water, and immediately cut the resultant product into a particle shape, so that particles are obtained, and then (ii) cool the particles. By thus melting and kneading the resins, the resins are made into a more uniform base material resin. Alternatively, it is possible to (i) introduce the polypropylene resin A and the polypropylene resin B into an extruder, (ii) as necessary, feed an additive (e.g. an expansion nucleating agent, a hydrophilic compound, a colorant) from a middle part of the extruder so as to be mixed in the extruder, and (iii) melt and knead a resultant mixture in the extruder.

A weight of each of the polypropylene resin particles thus obtained may be 0.2 mg per particle or more to 10 mg per particle or less, such as 0.5 mg per particle or more to 5 mg per particle or less. If the weight of each of the polypropylene resin particles is less than 0.2 mg per particle, then handleability tends to decrease. If the weight is more than 10 mg per particle, then a mold-filling property during an in-mold foaming molding step tends to decrease.

The expanded polypropylene resin particles in accordance with one or more embodiments of the present invention may be expanded composite particles obtained by covering an expanded polypropylene resin core layer with a polypropylene resin covering layer. Examples of a method of producing the expanded polypropylene resin particles encompass a method in which composite resin particles are first produced, the composite resin particles including a non-expanded polypropylene resin core layer and a non-expanded polypropylene resin covering layer. Examples of a method of producing such composite resin particles encompass a method in which a die provided at a tip of an extruder is a core-sheath coextrusion die such as those disclosed in Japanese Examined Patent Application Publication, Tokukosho, No. 41-16125, Japanese Examined Patent Application Publication, Tokukosho, No. 43-23858, Japanese Examined Patent Application Publication, Tokukosho, No. 44-29522, Japanese Patent Application Publication, Tokukaisho, No. 60-185816, and the like.

In such a case, two extruders are used such that (i) a polypropylene resin for forming a polypropylene resin core layer is melted and kneaded in one of the two extruders, (ii) a polypropylene resin for constituting a polypropylene resin covering layer is melted and kneaded in the other one of the two extruders, (iii) molten resins thus obtained are introduced into a coextrusion die which is connected to the two extruders, and (iv) a sheath-core composite, which includes the polypropylene resin core layer and the polypropylene resin covering layer, is discharged in a strand shape. After the discharged substance in a strand shape is cooled by, for example, being allowed to pass through water, the discharged substance is cut so as to have a certain weight or size by use of a cutting machine including a drawing machine. This makes it possible to obtain composite resin particles each including a polypropylene resin core layer and a polypropylene resin covering layer. Alternatively, it is possible to (i) directly extrude the discharged substance in a strand shape through the die into water, and immediately cut the discharged substance into a particle shape, so that particles are obtained, and then (ii) cool the particles.

A polypropylene resin covering layer which is less in thickness causes foaming of a polypropylene resin covering layer to be less likely to occur during foaming of composite resin particles. However, a polypropylene resin covering layer is excessively thin, then sufficient covering is difficult. Therefore, a thickness of a polypropylene resin covering layer before being produced into expanded polypropylene resin particles (expanded composite particles) may be 0.1 μm or more to 300 μm or less, and a thickness of a polypropylene resin covering layer after being produced into the expanded polypropylene resin particles (expanded composite particles) may be 0.1 μm or more to 250 μm or less.

A weight ratio between the polypropylene resin core layer and the polypropylene resin covering layer may be 99.5:0.5 to 65:35, such as 99:1 to 70:30, or such as 97:3 to 80:20. The weight ratio between the polypropylene resin core layer and the polypropylene resin covering layer can be adjusted by adjusting respective discharge quantities the two extruders.

Note that it may be possible that (i) an expansion nucleating agent, a hydrophilic compound, and/or an antioxidant, for example, is/are added to the polypropylene resin for forming a polypropylene resin core layer and (ii) an antistatic agent, a flame retarder, and/or an electrically conductive agent, for example, is/are added to the polypropylene resin for constituting a polypropylene resin covering layer. However, one or more embodiments of the present invention is not limited to such a configuration, and such additives can be adjusted as appropriate.

Expanded polypropylene resin particles may be produced with the use of polypropylene resin particles (or composite resin particles) thus obtained.

Examples of a method of producing the expanded polypropylene resin particles in accordance with one or more embodiments of the present invention encompass a method of producing expanded polypropylene resin particles in an aqueous dispersion system by carrying out the following foaming step: (i) polypropylene resin particles along with a foaming agent such as carbon dioxide are dispersed into an aqueous dispersion medium in a pressure-resistant container, (ii) a resultant dispersion liquid is heated to a temperature equal to or higher than a softening temperature of the polypropylene resin particles and is subjected to pressure, (iii) the temperature and the pressure are retained for a certain period of time, (iv) the dispersion liquid is released to a region having a pressure lower than an internal pressure of the pressure-resistant container, so that the expanded polypropylene resin particles are obtained.

Specifically,
(1) Polypropylene resin particles, an aqueous dispersion medium, and, as necessary, a dispersing agent, for example, are placed into the pressure-resistant container. Then, while a resultant mixture is stirred, the inside of the pressure-resistant container is vacuumed as necessary. Then, a foaming agent having a pressure of 1 MPa (gage pressure) or more to 2 MPa (gage pressure) or less is introduced, and then the mixture is heated to a temperature equal to or higher than the softening temperature of the polypropylene resin. By the heating, the internal pressure of the pressure-resistant container rises to approximately 2 MPa (gage pressure) or more to 5 MPa (gage pressure) or less. The expanded polypropylene resin particles can also be obtained by (i) further adding, as necessary, a foaming agent around a foaming temperature to adjust a foaming pressure to a desired pressure, (ii) further adjusting a temperature, (iii) retaining adjusted temperature and the adjusted pressure for a certain period of time, (iv) releasing, into a region having a pressure lower than the internal pressure of the pressure-resistant container, the dispersion liquid in the pressure-resistant container.

As another embodiment disclosed herein, the following aspect is possible:
(2) Polypropylene resin particles, an aqueous dispersion medium, and, as necessary, a dispersing agent, for example, are placed into the pressure-resistant container. Then, while a resultant mixture is stirred, the inside of the pressure-resistant container is vacuumed as necessary. Then, while the mixture is heated to a temperature equal to or higher than the softening temperature of the polypropylene resin, a foaming agent is introduced into the dispersion liquid in the pressure-resistant container.

As yet another embodiment disclosed herein, the following aspect is possible:
(3) Polypropylene resin particles, an aqueous dispersion medium, and, as necessary, a dispersing agent, for example, are placed into the pressure-resistant container. Then, a resultant mixture is heated to a temperature around a foaming temperature. Then, a foaming agent is further introduced into the dispersion liquid in the pressure-resistant container, and a resultant mixture is at foaming temperature. Then, the foaming temperature is retained for a certain period of time. Then, the dispersion liquid in the pressure-resistant container is released into a region having a pressure lower than an internal pressure of the pressure-resistant container, so that expanded polyolefin resin particles are obtained.

Note that the expansion ratio can be adjusted by (i) adjusting a pressure-releasing speed during foaming by increasing the internal pressure of the pressure-resistant container through injecting carbon dioxide, nitrogen, air, or a substance used as a foaming agent, into the pressure-resistant container before the dispersion liquid in the pressure-resistant container is released into the low-pressure region and (ii) controlling the pressure through introducing carbon dioxide, nitrogen, air, or a substance used as a foaming agent, into the pressure-resistant container also while the dispersion liquid in the pressure-resistant container is being released into the low-pressure region.

In one or more embodiments of the present invention, the pressure-resistant container into which the polypropylene resin particles are dispersed is not limited to any particular one, provided that the pressure-resistant container is capable of resisting a pressure and temperature inside the container during production of the expanded particles. Examples of the pressure-resistant container encompass an autoclave-type pressure-resistant container.

An aqueous dispersion medium for use in one or more embodiments of the present invention may be water. Alternatively, the aqueous dispersion medium can also be a dispersion medium obtained by adding methanol, ethanol, ethylene glycol, glycerin, or the like to water. In a case where the base material resin contains a hydrophilic compound, water in the aqueous dispersion medium serves also as a foaming agent. This contributes to an increase in expansion ratio.

Examples of the foaming agent for use in one or more embodiments of the present invention encompass: saturated hydrocarbons such as propane, butane, and pentane; ethers such as dimethyl ether; alcohols such as methanol and ethanol; and inorganic gas such as air, nitrogen, carbon dioxide, and water. Among these foaming agents, an inorganic gas foaming agent has particularly small environmental impact and has no dangerous inflammability, and is therefore may be used. It may also be possible to use at least one foaming agent selected from the group consisting of carbon dioxide and water.

In one or more embodiments of the present invention, it may be possible to use a dispersing agent and/or a dispersion auxiliary agent in order to prevent polypropylene resin particles in an aqueous dispersion medium from adhering to each other.

Examples of the dispersing agent encompass inorganic dispersion agents such as tertiary calcium phosphate, tertiary magnesium phosphate, basic magnesium carbonate, calcium carbonate, barium sulfate, kaolin, talc, and clay. These inorganic dispersion agents can be used individually, or two or more of these inorganic dispersion agents can be used in combination.

Examples of the dispersion auxiliary agent encompass: (i) anionic surfactants of carboxylate type, (ii) anionic surfactants of sulfonate type such as alkylsulfonic acid salt, n-paraffin sulfonate salt, alkyl benzene sulfonate, alkyl naphthalene sulfonate, and sulfosuccinate, (iii) anionic surfactants of sulfate ester type such as sulfonated oil, alkyl sulfate salt, alkyl ether sulfate, and alkyl amide sulfate, and (iv) anionic surfactants of phosphate ester type such as alkyl phosphate, polyoxyethylene phosphate, and alkyl allyl ether sulfate. These dispersion auxiliary agents can be used individually or two or more of these dispersion auxiliary agents can be used in combination.

Of these, the following may be used in combination: (i) at least one dispersing agent selected from the group consisting of tertiary calcium phosphate, tertiary magnesium phosphate, barium sulfate, and kaolin; and (ii) a dispersion auxiliary agent which is n-paraffin sulfonic acid soda.

It may be possible to use an aqueous dispersion medium in an amount of equal to or greater than 100 parts by weight and equal to or less than 500 parts by weight with respect to 100 parts by weight of polypropylene resin particles so that dispensability of the polypropylene resin particles in the aqueous dispersion medium is good. The respective amounts of dispersing agent and dispersion auxiliary agent vary, depending on (i) the types of the dispersing agent and the dispersion auxiliary agent and (ii) the type of and amount of polypropylene resin particles used. Ordinarily, with respect to 100 parts by weight of polypropylene resin particles, the dispersing agent may be used in an amount of 0.2 parts by weight or more to 3 parts by weight or less, and the dispersion auxiliary agent may be used in an amount of 0.001 parts by weight or more to 0.1 parts by weight or less.

The step of thus obtaining expanded polypropylene resin particles from polypropylene resin particles may be referred to as "first-stage foaming step", and the expanded polypropylene resin particles thus obtained may be referred to as "first-stage expanded particles".

An expansion ratio of first-stage expanded particles may not reach 10 times, depending on foaming conditions such as foaming temperature, foaming pressure, and the type of foaming agent. In such a case, expanded polypropylene resin particles whose expansion ratio is increased in comparison with that of first-stage expanded particles can be obtained by (i) applying an internal pressure to the first-stage expanded particles by impregnation of inorganic gas (e.g. air, nitrogen, carbon dioxide) and then (ii) causing the first-stage expanded particles to come into contact with steam having a certain pressure.

The step of thus further foaming the expanded polypropylene resin particles so as to obtain expanded polypropylene resin particles having a high expansion ratio may be referred to as "second-stage foaming step". Expanded polypropylene resin particles thus obtained through the second-stage foaming step may be referred to as "second-stage expanded particles".

A pressure of steam in the second-stage foaming step may be adjusted 0.04 MPa (gage pressure) or more to 0.25 MPa (gage pressure) or less, such as 0.05 MPa (gage pressure) or more to 0.15 MPa (gage pressure) or less, in view of the expansion ratio of the second-stage expanded particles.

If the pressure of steam in the second-stage foaming step is less than 0.04 MPa (gage pressure), then the expansion ratio is less likely to increase. If the pressure is more than 0.25 MPa (gage pressure), then second-stage expanded particles to be obtained tend to adhere to each other, so that it becomes impossible to use the second-stage expanded particles for subsequent in-mold foaming molding.

An internal pressure of air to be impregnated into the first-stage expanded particles may be (i) made to change as appropriate in view of (a) the expansion ratio of the second-stage expanded particles and (b) steam pressure in the second-stage foaming step and (ii) 0.2 MPa or more (absolute pressure) or more to 0.6 MPa or less (absolute pressure).

If the internal pressure of air to be impregnated into the first-stage expanded particles is less than 0.2 MPa (absolute pressure), then steam having a high pressure is necessary to increase the expansion ratio, so that the second-stage expanded particles tend to adhere to each other. If the internal pressure of air to be impregnated into the first-stage expanded particles is more than 0.6 MPa (absolute pressure), then the second-stage expanded particles tend to become an open-cell foam. In such a case, rigidity, such as compressive strength, of an in-mold expanded molded product tends to decrease.

The expansion ratio of the expanded polypropylene resin particles is not particularly limited, and may be 5 times or more to 60 times or less. If the expansion ratio of the expanded polypropylene resin particles is less than 5 times, then reductions in weights of expanded polypropylene resin particles and of a polypropylene resin in-mold expanded molded product tend to be insufficient. If the expansion ratio of the expanded polypropylene resin particles is more than 60 times, then mechanical strengths of expanded polypropylene resin particles and of a polypropylene resin in-mold expanded molded product tend to be impractical.

An average cell diameter of the expanded polypropylene resin particles may be 100 μm or more to 340 μm or less, such as 110 μm or more to 330 μm or less, or such as 120 μm or more to 250 μm or less. If the average cell diameter falls within these ranges, then the polypropylene resin in-mold expanded molded product tends to (i) have a good surface appearance and (ii) have a high compressive strength.

Note that the average cell diameter of the expanded polypropylene resin particles can be controlled by adjusting the amount of an expansion nucleating agent to add. Alternatively, the average cell diameter can be controlled by, for example, adjusting a high-temperature heat quantity ratio described later. If the high-temperature heat quantity ratio is less than 15%, then the average cell diameter tends to become large. If the high-temperature heat quantity ratio is more than 50%, then the average cell diameter tends to become small.

Figure 2:
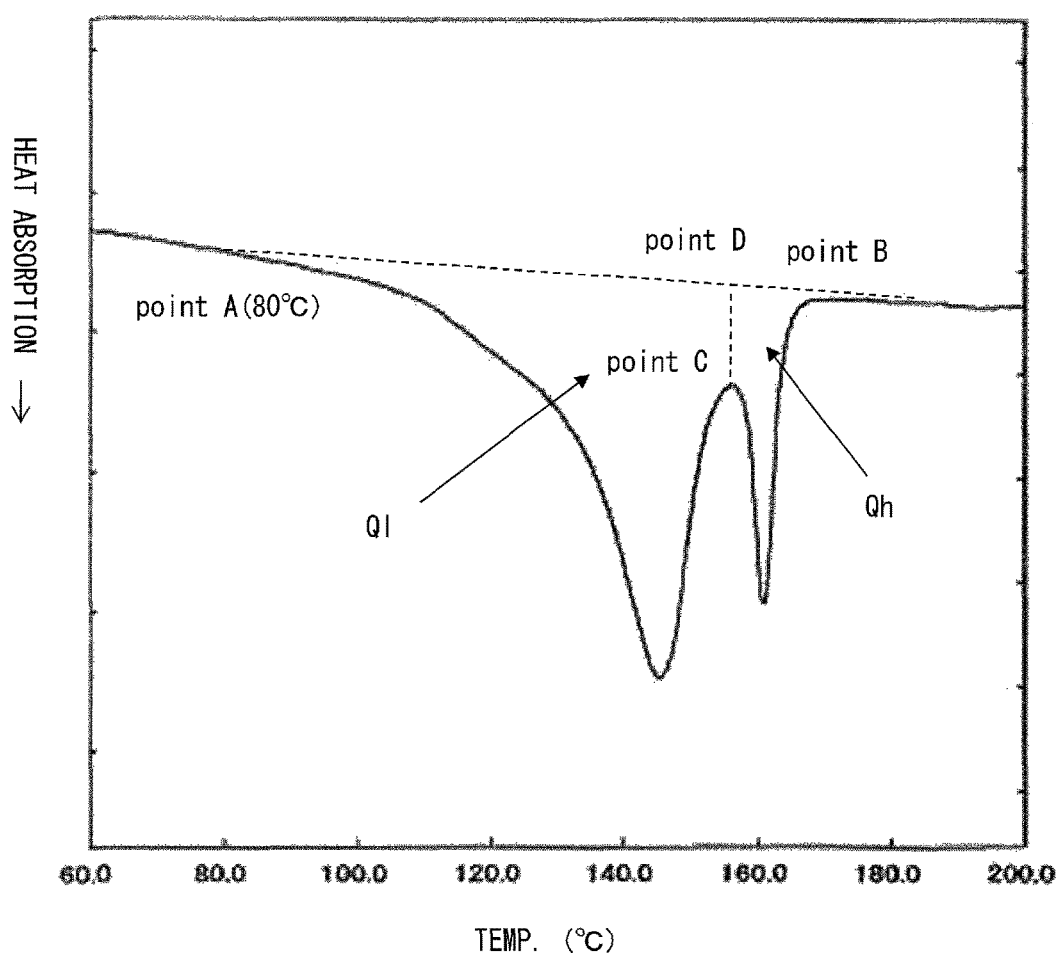
FIG. 2 is a view illustrating a DSC curve (temperature vs heat absorption quantity) obtained by a differential scanning calorimetry (DSC) in which a temperature of an expanded polypropylene resin particle is raised from 40° C. to 220° C. at a heating rate of 10° C./min. The DSC curve shows two melting peaks and two melting heat quantity regions. The two melting heat quantity regions are a low temperature-side melting heat quantity region Ql and a high temperature-side melting heat quantity region Qh.

In a DSC curve which is obtained by differential scanning calorimetry (DSC) in which a temperature of the expanded polypropylene resin particles is raised at a heating rate of 10° C./min, as illustrated in FIG. 2, expanded polypropylene resin particles have (i) at least two melting peaks and (ii) at least two melting heat quantities of a low temperature-side melting heat quantity (Ql) and a high temperature-side melting heat quantity (Qh).

As described earlier, a resin other than a polypropylene resin can be mixed. In such a case, if a polyethylene resin is mixed, then not only the two melting peaks in FIG. 2 but a melting peak (or shoulder) based on the polyethylene resin may appear in a DSC curve obtained. That is, the total of three melting peaks may appear in the DSC curve.

Expanded polypropylene resin particles having at least two melting peaks can be easily obtained by, in the earlier-described method of producing expanded polypropylene resin particles in an aqueous dispersion system, (i) controlling, as appropriate, a temperature in the pressure-resistant container during foaming to a proper value and (ii) retaining the temperature for a certain period of time. That is, in a case where a melting point of a polypropylene resin (base material resin) is $t_m(° C.)$, the temperature in the pressure-resistant container during foaming may be $t_m-8(° C.)$ or higher, such as $t_m-5(° C.)$ or high and $t_m+4(° C.)$ or lower, or such as $t_m-5(° C.)$ or higher and $t_m+3(° C.)$ or lower.

A period of time during which the polypropylene resin particles are retained at the temperature controlled in the pressure-resistant container during foaming may be 1 min. or more to 120 min. or less, such as 5 min or more to 60 min. or less.

In one or more embodiments of the present invention, an entire melting heat quantity (Q), a low temperature-side melting heat quantity (Ql), and a high temperature-side melting heat quantity (Qh) of expanded polypropylene resin particles are defined as follows by use of FIG. 2. In the DSC obtained (FIG. 2), the entire melting heat quantity (Q=Ql+Qh), which is the sum of the low temperature-side melting heat quantity (Ql) and the high temperature-side melting heat quantity (Qh), is indicated by a part surrounded by a (i) line segment A-B which is drawn so as to connect a heat absorption quantity (point A) at temperature 80° C. and a heat absorption quantity (point B) at a temperature at which melting on a high temperature side ends and (ii) the DSC curve.

The low temperature-side melting heat quantity (Ql) is indicated by a part surrounded by a line segment A-D, a line segment C-D, and the DSC curve, and the high temperature-side melting heat quantity (Qh) is indicated by a part surrounded by a line segment B-D, the line segment C-D, and the DSC curve where (i) a point C is a point at which a heat absorption quantity between two melting heat quantity regions in the DSC curve is the smallest, the two melting heat quantity regions being a region of the low temperature-side melting heat quantity and a region of the high temperature-side melting heat quantity and (ii) a point D is a point at which the line segment A-B intersects a line that is drawn so as to extend, parallel to a Y-axis (axis indicating the heat absorption quantity), from the point C toward the line segment A-B. Note that in a case where three melting peaks appear, there appear two points at which the heat absorption quantity is the smallest between two adjacent melting heat quantity regions. In such a case, out of the two points, the point on the high-temperature side is regarded as the point C.

The expanded polypropylene resin particles may haves a ratio of the high temperature-side melting heat quantity (Qh) to the entire melting heat quantity $[=\{Qh/(Ql+Qh)\}\times 100$ (%)] (hereinafter also referred to as "high-temperature heat quantity ratio"), which ratio may be 15% or more to 50% or less, such as 15% or more to 40% or less, or such as 20% or more to 30% or less. In a case where the high-temperature heat quantity ratio falls within these ranges, even if a molding temperature (steam pressure) during production of a polypropylene resin in-mold expanded molded product is low, it is still easy to obtain a polypropylene resin in-mold expanded molded product which (i) has a good surface appearance, (ii) has a high compressive strength, and (iii) has good fusibility.

The high-temperature heat quantity ratio of the expanded polypropylene resin particles can be adjusted as appropriate by, for example, (i) a retention time at the temperature in the pressure-resistant container (i.e. a retention time that (a) starts from a time point at which the polypropylene resin particles reach a desired temperature in the pressure-resistant container and (b) ends at time point at which the polypropylene resin particles foam, (ii) a foaming temperature (which is a temperature during foaming and which may or may not be identical to the temperature in the pressure-resistant container), and (iii) foaming pressure (pressure during foaming). In general, a high-temperature heat quantity ratio or a heat quantity at the high temperature-side melting peak tends to become large by extending a retention time, decreasing a foaming temperature, or decreasing foaming pressure. Because of these factors, conditions to obtain a desired high-temperature heat quantity ratio can be easily found by conducting several experiments in which a retention time, a foaming temperature, or a foaming pressure is systematically changed. Note that the foaming pressure can be adjusted by adjusting the amount of a foaming agent.

PCT International Publication No. WO2009/001626 discloses an expanded polypropylene resin particle which has such a crystal structure that a DSC curve, which is obtained in a first temperature rise when a temperature of an expanded polypropylene resin particle is raised from room temperature to 200° C. at a heating rate of 2° C./min. in heat flux differential scanning calorimetry, shows (i) a main endothermic peak of 100° C. to 140° C. endothermic peak apex temperature exhibiting 70% to 95% endothermic peak heat quantity with respect to an entire endothermic peak heat quantity and (ii) two or more endothermic peaks appearing on a high-temperature side with respect to the main endothermic peak.

In terms used in PCT International Publication No. WO2009/001626, the expanded polypropylene resin particles are not limited to any number of endothermic peaks on a high-temperature side with respect to a main endothermic peak in heat flux differential scanning calorimetry at a heating rate of 2° C./min, but may have such a crystal structure that one endothermic peak appears.

The expanded polypropylene resin particles having such a crystal structure that one endothermic peak appears can be easily obtained by use of a base material resin including (i) a polypropylene resin A having a melting point of 130° C. or higher to 140° C. or lower and (ii) a polypropylene resin B having a melting point higher than that of the polypropylene resin A by less than 25° C.

The expanded polypropylene resin particles having such a crystal structure that one endothermic peak may appear because, with such expanded polypropylene resin particles, (i) compatibility between both resins (polypropylene resin A and polypropylene resin B) when melted and kneaded is good, (ii) a variance in cell diameter of expanded polypropylene resin particles becomes small, and (iii) an in-mold expanded molded product has a good surface appearance.

The expanded polypropylene resin particles may be made into a polypropylene resin in-mold expanded molded product by a conventionally known in-mold foaming molding method.

Examples of an in-mold foaming molding method encompass:

i) a method of (a) subjecting expanded polypropylene resin particles to a pressure treatment with the use of inorganic gas (e.g. air, nitrogen, carbon dioxide) so that the expanded polypropylene resin particles, into which the inorganic gas is impregnated, has a certain internal pressure and (b) filling a mold with the expanded polypropylene resin particles, and (c) heating the mold by steam so that the expanded polypropylene resin particles are fused to each other.

ii) a method of (a) compressing expanded polypropylene resin particles by gas pressure, (b) filling a mold with the expanded polypropylene resin particles, and (c) heating the mold by steam so that the expanded polypropylene resin particles are fused to each other by the effect of resilience of the expanded polypropylene resin particles.

iii) a method of (a) filling a mold with expanded polypropylene resin particles without any particular pretreatment and (b) heating the mold by steam so that the expanded polypropylene resin particles are fused to each other.

The polypropylene resin in-mold expanded molded product may be obtained as a high-compressive-strength polypropylene resin in-mold expanded molded product by subjecting expanded polypropylene resin particles to in-mold foaming molding while a molding temperature (steam pressure) is reduced. The polypropylene resin in-mold expanded molded product may be used in that a relationship particularly between a density of the molded product and a 50%-strained compressive strength satisfies the following Formula (1):

[50%-strained compressive strength (MPa)]≥0.0069× [Density (g/L) of molded product]+0.018   (1)

Specifically, polypropylene resin in-mold expanded molded products satisfying Formula (1) have conventionally been used as highly strong polypropylene resin in-mold expanded molded products for automobile interior materials and automobile bumper core materials. However, such conventional polypropylene resin in-mold expanded molded products require a high molding temperature during in-mold foaming molding. For example, during in-mold foaming molding in which steam is used, such a high steam pressure as 0.24 MPa (gage pressure) or more was necessary. However, it may be possible to produce a polypropylene resin in-mold expanded molded product satisfying Formula (1) even with such a low steam pressure as 0.22 MPa (gage pressure) or less.

The polypropylene resin in-mold expanded molded product in accordance with one or more embodiments of the present invention is not limited to any particular density. With the conventional technologies, a decrease in compressive strength in a case where molding is possible with a low steam pressure (molding temperature) tends to be remarkable in a case where a density of molded product is 40 g/L or less. In view of this, the density of the molded product may be 40 g/L or less. The density of the molded product may be 20 g/L or more to 40 g/L or less, such as 20 g/L or more to 35 g/L or less.

A polypropylene resin in-mold expanded molded product thus obtained can be put to various applications such as heat insulating materials, shock-absorbing packing materials, and returnable containers in addition to automobile interior materials and automobile bumper core materials.

In particular, the polypropylene resin in-mold expanded molded product may be used for automobile materials such as automobile interior materials and automobile bumper core materials because such automobile materials obtained from the polypropylene resin in-mold expanded molded product, which can be molded with a lower molding temperature (steam pressure), exhibit a compressive strength similar to those obtained from conventional molded products molded with a high molding temperature (steam pressure).

One or more embodiments of the present invention may be configured as follows:

[1] A polypropylene resin in-mold expanded molded product obtained by subjecting, to in-mold foaming molding, expanded polypropylene resin particles obtained from a base material resin which includes (i) a polypropylene resin A satisfying the following condition (a) and having a melting point of 130° C. or higher to 140° C. or lower and (ii) a polypropylene resin B having a melting point of 145° C. or higher to 165° C. or lower:

(a) a structural unit of 1-butene is present in an amount of 3 weight % or more to 15 weight % or less with respect to 100 weight % entire structural units.

[2] The polypropylene resin in-mold expanded molded product as set forth in [1], configured such that the polypropylene resin A satisfies the following condition (b):

(b) a structural unit of ethylene is present in amount of 2 weight % or more to 10 weight % or less with respect to 100 weight % entire structural units.

[3] The polypropylene resin in-mold expanded molded product as set forth in [1] or [2], configured such that: the base material resin includes the polypropylene resin A in an amount of 50 weight % or more to 70 weight % or less and the polypropylene resin B in an amount of 30 weight % or more to 50 weight % or less; and the polypropylene resin A and the polypropylene resin B together account for 100 weight %.

[4] The polypropylene resin in-mold expanded molded product as set forth in any one of [1] through [3], configured such that the melting point of the base material resin is 140° C. or higher to 150° C. or lower.

[5] The polypropylene resin in-mold expanded molded product as set forth in any one of [1] through [4], configured such that the melting point of the base material resin is 146° C. or higher to 148° C. or lower.

[6] The polypropylene resin in-mold expanded molded product as set forth in any one of [1] through [5], configured such that the polypropylene resin B is a propylene-ethylene random copolymer or a propylene-ethylene-1-butene random copolymer.

[7] The polypropylene resin in-mold expanded molded product as set forth in any one of [1] through [6], configured such that the polypropylene resin A is obtained with use of a Ziegler catalyst.

[8] The polypropylene resin in-mold expanded molded product as set forth in any one of [1] through [7], configured such that:

the expanded polypropylene resin particles are each an expanded composite particle in which an expanded polypropylene resin core layer is covered with a polypropylene resin covering layer the expanded polypropylene resin core layer is obtained from a base material resin including a polypropylene resin A and a polypropylene resin B;

the polypropylene resin covering layer includes the polypropylene resin A.

[9] The polypropylene resin in-mold expanded molded product as set forth in any one of [1] through [8], configured such that the polypropylene resin in-mold expanded molded product has a density of 20 g/L or more to 40 g/L or less.

[10] A method of producing a polypropylene resin in-mold expanded molded product, including the steps of:

(A) obtaining expanded polypropylene resin particles by (i) placing polypropylene resin particles, water, and an inorganic gas foaming agent in a pressure-resistant container, so that a mixture is obtained, the polypropylene resin particles having been obtained from a base material resin including a polypropylene resin A satisfying the following condition (a) and having a melting point of 130° C. or higher to 140° C. or lower and a polypropylene resin B having a melting point of 145° C. or higher to 165° C. or lower, (ii) dispersing the polypropylene resin particles while the mixture is stirred, so that a dispersion liquid is obtained, (iii) increasing a temperature and a pressure, and then (iv) releasing the dispersion liquid from the pressure-resistant container into a region having a pressure lower than an internal pressure of the pressure-resistant container, so that the polypropylene resin particles are foamed; and (B) obtaining the in-mold expanded molded product by (i) filling a mold with the expanded polypropylene resin particles, and then (ii) heating the expanded polypropylene resin particles:

(a) a structural unit of 1-butene is present in an amount of 3 weight % or more to 15 weight % or less with respect to 100 weight % entire structural units.

[11] The method as set forth in [10], configured such that the polypropylene resin A satisfies the following condition (b):

(b) a structural unit of ethylene is present in amount of 2 weight % or more to 10 weight % or less with respect to 100 weight % entire structural units.

[12] The method as set forth in [10] or [11], further including the step of: melting and kneading the polypropylene resin A and the polypropylene resin B in an extruder and then obtaining polypropylene resin particles.

[13] The method as set forth in any one of [10] through [12], further including the step of: obtaining the polypropylene resin A by carrying out polymerization with use of a Ziegler catalyst.

[14] The method as set forth in any one of [10] through [13], configured such that:

the expanded polypropylene resin particles are each an expanded composite particle in which an expanded polypropylene resin core layer is covered with a polypropylene resin covering layer;

the expanded polypropylene resin core layer is obtained from a base material resin including the polypropylene resin A and the polypropylene resin B; and the polypropylene resin covering layer includes the polypropylene resin A.

EXAMPLES

The following description will discuss one or more embodiments of the present invention in more detail with Examples and Comparative Examples. Note, however, that the embodiments disclosed are not limited to these Examples and Comparative Examples.

[Polypropylene Resin]

Table 1 shows polypropylene resins A-1 through A-8, polypropylene resins B-1 through B-5, and a polypropylene resin C which were used. Note that a Polypropylene resin B-4 is a propylene homopolymer, whereas the other polypropylene resins are random copolymers.

TABLE 1

|  | Type of catalyst | Comonomer content (weight %) | | Melting point (° C.) | MFR (g/10 min.) |
| --- | --- | --- | --- | --- | --- |
|  |  | 1-butene | Ethylene |  |  |
| Polypropylene resin A-1 | Ziegler | 4.3 | 2.9 | 134 | 7 |
| Polypropylene resin A-2 | Ziegler | 7.0 | 2.5 | 132 | 8 |
| Polypropylene resin A-3 | Ziegler | 8.6 | 4.3 | 134 | 8 |
| Polypropylene resin A-4 | Ziegler | 9.5 | 5.1 | 136 | 7 |
| Polypropylene resin A-5 | Metallocene | 4.5 | 0.5 | 136 | 9 |
| Polypropylene resin A-6 | Ziegler | 1.9 | 5.1 | 132 | 8 |
| Polypropylene resin A-7 | Ziegler | 16.2 | — | 136 | 9 |
| Polypropylene resin A-8 | Ziegler | — | 4.1 | 139 | 7 |
| Polypropylene resin B-1 | Ziegler | — | 2.5 | 152 | 7 |
| Polypropylene resin B-2 | Ziegler | — | 3.1 | 151 | 7 |
| Polypropylene resin B-3 | Ziegler | 1.9 | 4.3 | 145 | 7 |
| Polypropylene resin B-4 | Ziegler | — | — | 164 | 5 |
| Polypropylene resin B-5 | Ziegler | — | 3.3 | 144 | 8 |
| Polypropylene resin C | Metallocene | — | 2.8 | 125 | 7 |

Polypropylene resin B-4 is a propylene homopolymer, and the other polypropylene resin is a random copolymer.

<Other Additives>

Talc: manufactured by Hayashi-Kasei Co., Ltd., Talcan Powder PK-S

Polyethylene glycol: manufactured by Lion Corporation, PEG#300

Carbon black: manufactured by Mitsubishi Chemical Corporation, MCF88 (average particle size: 18 nm)

In Examples and Comparative Examples, evaluations were made by the following methods:

(Quantification of Copolymer Composition)

A polypropylene resin having a known comonomer content was hot pressed at 180° C., so that a film having a thickness of approximately 100 μm was produced. The film thus produced was subjected to IR spectrum measurement so that a propylene-derived absorbance ($I_{810}$) at 810 cm$^{-1}$, an ethylene comonomer-derived absorbance ($I_{733}$) at 733 cm$^{-1}$, and a butene comonomer-derived absorbance ($I_{766}$) at 766 cm$^{-1}$ were read. Then, an absorbance ratio ($I_{733}/I_{810}$) is shown in a horizontal axis, and an ethylene comonomer content is shown in a vertical axis, so that a calibration curve indicative of the ethylene comonomer content was obtained. Likewise, an absorbance ratio ($I_{766}/I_{810}$) is shown in a horizontal axis, and a butene comonomer content is shown in a vertical axis, so that a calibration curve indicative of the butene comonomer content was obtained. Then, as with the method of preparing a sample during production of the calibration curves, (i) a polypropylene resin having an unknown comonomer content was hot pressed, so that a film having a thickness of approximately 100 μm was produced, (ii) $I_{810}$, $I_{733}$, and $I_{766}$ were read by IR spectrum measurement, and (iii) an ethylene comonomer content and a butene comonomer content were calculated according to the calibration curves produced earlier.

(Measurement of Melting Point $t_m$ of Polypropylene Resin or Base Material Resin)

A melting point $t_m$ of the polypropylene resin was measured with the use of a differential scanning calorimeter DSC (manufactured by Seiko Instruments Inc., model: DSC6200). Specifically, the melting point $t_m$ was found as a melting peak temperature in a second temperature rise on a DSC curve obtained by (i) raising a temperature of 5 mg to 6 mg of the polypropylene resin (polypropylene resin particles) from 40° C. to 220° C. at a heating rate of 10° C./min so as to melt the polypropylene resin, (ii) lowering the temperature from 220° C. to 40° C. at a cooling rate of 10° C./min so as to crystallize the polypropylene resin (polypropylene resin particles), and then (iii) raising the temperature again from 40° C. to 220° C. at a heating rate of 10° C./min (see $t_m$ in FIG. 1).

Note that in a case where two melting peaks appear in the DSC curve of the second temperature rise, a temperature of a melting peak having a larger heat absorption quantity was used as a $t_m$.

(Expansion Ratio of Expanded Polypropylene Resin Particles)

Approximately 3 g or more to 10 g or less of the expanded polypropylene resin particles obtained was used. Then, the expanded polypropylene resin particles were dried at 60° C. for 6 hours, and were then subjected to conditioning indoors at 23° C. and at a humidity of 50%. Then, after a weight w (g) of the expanded polypropylene resin particles was measured, a volume v (cm$^3$) of the expanded polypropylene resin particles was measured by an immersing the resultant particles, so that an absolute specific gravity (ρb=w/v) of the expanded particles was obtained. Then, based on a ratio of the absolute specific gravity to a density (ρr) of the polypropylene resin particles before foaming, an expansion ratio (K=ρr/ρb) was calculated. Note that in each of Examples and Comparative Examples, the density (ρr) of the polypropylene resin particles before foaming (polypropylene resin particles) was 0.9 g/cm$^3$.

(Average Cell Diameter of Expanded Polypropylene Resin Particle)

While caution was exercised so that a foam membrane (cell membrane) in an expanded polypropylene resin particle obtained would not be destroyed, the expanded particle was cut substantially through a center part, and then a cross section was observed with the use of a microscope (manufactured by Keyence Corporation: VHX digital microscope). A line segment, a length of which corresponds to 1000 μm, was drawn on an entire portion of a photograph captured by the microscope for observation except a portion of a surface layer of the expanded particle. Then, the number (n) of cells on which the line segment passes was counted, so that a cell diameter was calculated in 1000/n (μm). Such operations were carried out for 10 expanded particles, and an average value of respective cell diameters of cells calculated in the 10 operations was regarded as an average cell diameter of the expanded polypropylene resin particles.

(Calculation of High-Temperature Heat Quantity Ratio of Expanded Polypropylene Resin Particles)

A high-temperature heat quantity ratio [={Qh/(Ql+Qh)}×100(%)] was calculated based on a DSC curve in a first temperature rise (see FIG. 2) which was obtained with the use of a differential scanning calorimeter (manufactured by Seiko Instruments Inc., model: DSC6200) by raising a temperature of 5 mg to 6 mg of the expanded polypropylene resin particles from 40° C. to 220° C. at a heating rate of 10° C./min. In the DSC obtained illustrated in FIG. 2, an entire melting heat quantity (Q=Ql+Qh), which is the sum of a low temperature-side melting heat quantity (Ql) and a high temperature-side melting heat quantity (Qh), is indicated by a part surrounded by a (i) line segment A-B which is drawn so as to connect a heat absorption quantity (point A) at temperature 80° C. and a heat absorption quantity (point B) at a temperature at which melting on a high temperature side ends and (ii) the DSC curve. The low temperature-side melting heat quantity (Ql) is indicated by a part surrounded by a line segment A-D, a line segment C-D, and the DSC curve and the high temperature-side melting heat quantity (Qh) is indicated by a part surrounded by a line segment B-D, the line segment C-D, and the DSC curve where (i) a point C is a point at which a heat absorption quantity between two melting heat quantity regions in the DSC curve is the smallest, the two melting heat quantity regions being a region of the low temperature-side melting heat quantity and a region of the high temperature-side melting heat quantity and (ii) a point D is a point at which the line segment A-B intersects a line that is drawn so as to extend, parallel to a Y-axis (axis indicating the heat absorption quantity), from the point C toward the line segment A-B. Note that in a case where three melting peaks appear, there appear two points at which the heat absorption quantity is the smallest between two adjacent melting heat quantity regions. In such a case, out of the two points, the point on the high-temperature side was regarded as the point C.

(DSC Measurement of Expanded Polypropylene Resin Particles at Heating Rate of 2° C./min.)

DSC measurement was carried out with the use of a differential scanning calorimeter (manufactured by Seiko Instruments Inc., model: DSC6200) by raising a temperature of 1 mg to 3 mg of expanded polypropylene resin particles from 40° C. to 200° C. at a heating rate of 2° C./min.

(Moldability Evaluation)

With the use of a polyolefin molding machine (manufactured by DAISEN Co., Ltd., KD-345), (i) a mold, which allows a plate-like in-mold expanded molded product having a size of length 300 mm×width 400 mm×thickness 50 mm to be obtained, was filled with expanded particles while cracking was 5 mm, which expanded particles had been prepared in advance so that expanded polypropylene resin particles would have an internal air pressure as shown in Table 2 or 3 and (ii) the expanded particles were heat molded by being compressed by 10% in thicknesswise directions. This resulted in a plate-like polypropylene resin in-mold expanded molded product having a size of length 300 mm×width 400 mm×thickness 50 mm. In so doing, after the mold was filled with the expanded polypropylene resin particles and the mold was then completely closed, air in the mold was purged by use of steam having a pressure of 0.1 MPa (gage pressure) (preheating step), the expanded polypropylene resin particles were heat molded for 10 sec. by use of heating steam having a certain molding pressure (both-surface heating step). This resulted in an in-mold expanded molded product. The polypropylene resin in-mold expanded molded product obtained was (i) left at room temperature for 1 hour, (ii) cured and dried in a thermostatic chamber at 75° C. for 3 hours, and (iii) extracted again and left at room temperature for 24 hours. Then, fusibility and a surface property were evaluated. Note that during in-mold foaming molding, the in-mold expanded molded product was molded while the molding pressure (steam pressure) in the both-surface heating step was changed in increments of 0.01 MPa. The lowest molding pressure, at which an in-mold expanded molded product whose fusibility was evaluated as "good" or "excellent" in fusibility evaluation (see below) was obtained, was regarded as a minimum molding pressure. An in-mold expanded molded product molded with the minimum molding pressure was subjected to (i) surface appearance evaluation, (ii) molded product density measurement, and (iii) 50%-strained compressive strength measurement.

<Fusibility>

The in-mold expanded molded product thus obtained was (i) notched by 5 mm in a thickness-wise direction with the use of a cutter and (ii) cleaved by hand. A cleaved surface was observed by visual inspection, and a percentage of clefts in expanded particles and not clefts in the interfaces of the expanded particles was obtained. Then, fusibility was judged by the following criteria:

Excellent: The percentage of clefts in the expanded particles was 80% or more.
Good: The percentage of clefts in the expanded particles was 60% or more to less than 80%.
Failed: The percentage of clefts in the expanded particles was less than 60% (fusibility was so low that the percentage of clefts appearing in the interfaces of the expanded particles on the cleaved surface was more than 40%).

<Surface Appearance (Surface Part)>

A surface of having a length of 300 mm and a width of 400 mm of the in-mold expanded molded product obtained was obtained by visual inspection, and a surface property was judged by the following criteria:

E (Excellent): There is hardly any inter-particle space (spaces between expanded polypropylene resin particles); there is no noticeable surface unevenness; there is no wrinkle or shrinkage and the surface is therefore beautiful.
G (Good): Some inter-particle spaces, surface unevenness, shrinkage, or wrinkles are observed.
F (Failed): Inter-particle spaces, surface unevenness, shrinkage, or wrinkles are noticeable throughout the surface observed.

<Surface Appearance (Edge Part)>

An edge part (ridge part), at which two surfaces of the in-mold expanded molded product obtained intersect, was obtained by visual inspection, and surface appearance was judged by the following criteria:

E (Excellent): An edge part (ridge part), at which two surfaces of the in-mold expanded molded product obtained intersect, had no unevenness resulting from the expanded polypropylene resin particles and had a clear ridge formed; mold transferability is good. Even if the edge part was rubbed with a finger, the expanded particles were not peeled off.
F (Failed): Unevenness resulting from the expanded polypropylene resin particles was noticeable at an edge part (ridge part); mold transferability was poor. If the edge part was rubbed with a finger, then the expanded particles were easily peeled off.

(Molded Product Density)

A test piece, which had a size of length 50 mm×width 50 mm×thickness 25 mm, was cut out from substantially a center part of the in-mold expanded molded product obtained. Note that the test piece had a thickness of 25 mm by cutting off, by approximately 12.5 mm, each of parts containing respective surface layers of the in-mold expanded molded product.

A weight W (g) of the test piece was measured, and the length, width, and thickness of the test piece were measured with the use of a caliper, so that a volume V ($cm^3$) of the test piece was calculated. Then, a molded product density was obtained by W/V. A conversion was made so that the unit was g/L.

(50%-Strained Compressive Strength and Evaluation)

The test piece, whose molded product density was measured, was subjected to a compressive strength test. Specifically, a compressive stress of the test piece when the test piece was compressed by 50% at a rate of 10 mm/min was measured with the use of a tension and compression testing machine (manufactured by Minebea Co., Ltd., TG series) in conformity with NDS Z 0504. In addition, the 50%-strained compressive strength was evaluated as follows.

The following Formula (1) is satisfied: A
The following Formula (1) is not satisfied, but the following Formula (2) is satisfied: B
The following Formula (2) is not satisfied: C $$[50\%\text{-strained compressive strength (MPa)}] \geq 0.0069 \times [\text{Molded product density (g/L)}] + 0.018 \quad (1)$$

$$[50\%\text{-strained compressive strength (MPa)}] \geq 0.0069 \times [\text{Molded product density (g/L)}] \quad (2)$$

Examples 1 Through 15 and Comparative Examples 1 Through 8

[Production of Polypropylene Resin Particles]

Polypropylene resin and additives were mixed in amounts shown in Tables 2 and 3 with the use of a blender. Each of the mixtures obtained was melted and kneaded at a resin temperature of 220° C. and extruded in a strand shape with the use of a twin-screw extruder (manufactured by O. N. Machinery Co., Ltd., TEK45). The strand thus extruded was water-cooled in a water tank having a length of 2 m, and was then cut. This resulted in polypropylene resin particles (1.2 mg per particle).

[Production of First-Stage Expanded Particles]

100 parts by weight of the polypropylene resin particles obtained, 300 parts by weight of water, 1.5 parts by weight of powdered basic tribasic calcium phosphate as a dispersing agent, 0.06 parts by weight of n-paraffin sulfonic acid soda as a dispersion auxiliary agent, and 7.5 parts by weight of carbon dioxide as a foaming agent were placed in a 10 L-pressure-resistant container. While a resultant mixture was stirred, a temperature of the mixture was raised to a foaming temperature shown in a corresponding part in Table 2 or 3, and the mixture was retained at the foaming temperature for 10 min. Then, carbon dioxide was additionally injected so that a foaming pressure was adjusted to a value shown in a corresponding part in Table 2 or 3. Then, the foaming pressure was retained for 30 min.

Then, a valve at a lower part of the pressure-resistant container was opened while carbon dioxide was injected such that the temperature and the pressure in the container were retained. An aqueous dispersion medium was released from the valve into air under atmospheric pressure through an orifice plate having an opening diameter of 3.6 mmφ, so that expanded polypropylene resin particles (first-stage expanded particles) were obtained. A high-temperature heat quantity ratio, a cell diameter, and an expansion ratio of the first-stage expanded particles thus obtained were measured. The results are shown in a corresponding part of Table 2 or 3. The first-stage expanded particles were subjected to DSC measurement at a heating rate of 10° C./min to obtain the high-temperature heat quantity ratio. Then, a DSC curve of a first temperature rise showed (i) one main endothermic peak and (ii) one high temperature peak on a high temperature-side of the main endothermic peak In each of Example 9, Comparative Examples 1 through 3, and Comparative Example 8, the expansion ratio of the first-stage expanded particles was 14 times. Therefore, (i) the first-stage expanded particles were dried at 80° C. for 6 hours, (ii) pressurized air was impregnated in the pressure-resistant container, so that the internal pressure was 0.21 MPa (absolute pressure), and then (iii) the first-stage expanded particles were allowed to come in contact with steam having a pressure of 0.04 MPa (gage pressure). This subjected the first-stage expanded particles to second-stage foaming. The expansion ratio of the second-stage expanded particles thus obtained was 19 times or 20 times. The second-stage expanded particles were also subjected to DSC measurement at a heating rate of 10° C./min. Then, a DSC curve of a first temperature rise showed (i) one main endothermic peak and (ii) one high temperature peak on a high temperature-side of the main endothermic peak. An apex temperature of the main endothermic peak of the second-stage expanded particles was identical to that of corresponding first-stage expanded particles. However, a shoulder, which was supposedly derived from heating during second-stage foaming, appeared around 110° C. on the DSC curve.

Note that expanded polypropylene resin particles were subjected to DSC measurement at a heating rate of 2° C./min. In each of Examples 1 through 6, Examples 8 through 15, and Comparative Examples 1 through 8, the DSC curve showed the total of two endothermic peaks which are (i) one main endothermic peak at 145° C. or lower and (ii) one high temperature peak on a high temperature-side of the main endothermic peak. In Example 7, the DSC curve showed the total of three endothermic peaks which are (i) one main endothermic peak at 145° C. or lower and (ii) two high temperature peaks on a high temperature-side of the main endothermic peak.

[Production of in-Mold Expanded Molded Product]

The first-stage expanded particles obtained (or second-stage expanded particles in Example 9, Comparative Examples 1 through 3, and Comparative Example 8) were introduced into a pressure-resistant container. Then, pressurized air was impregnated so that internal pressure of the expanded particles was adjusted in advance as shown in a corresponding part of Table 2 or 3.

Then, (i) a mold, which allows a plate-like in-mold expanded molded product having a size of length 300 mm×width 400 mm×thickness 50 mm to be obtained, was filled with the expanded polypropylene resin particles while cracking was 5 mm, which expanded polypropylene resin particles had the adjusted internal pressure and (ii) the expanded particles were heat molded by being compressed by 10% in thicknesswise directions. This resulted in a plate-like in-mold expanded molded product having a size of length 300 mm×width 400 mm×thickness 50 mm.

In so doing, after the mold was filled with the expanded polypropylene resin particles having the adjusted internal pressure and the mold was then completely closed, air in the mold was purged by use of steam having a pressure of 0.1 MPa (gage pressure) (preheating step), the expanded polypropylene resin particles were heat molded for 10 sec. by use of heating steam having a certain molding pressure (both-surface heating step). This resulted in an in-mold expanded molded product. Note that (i) the preheating step was carried out for 10 sec., (ii) the step of heating one side was carried out for 2 sec., (iii) the step of heating the other side was carried out for 2 sec., and (iv) the both-surface heating step was carried out for 10 sec. as described above. Note also that the in-mold expanded molded product was prepared while a molding pressure (steam pressure) was changed in 0.01 MPa increments in the both-surface heating step.

Tables 2 and 3 show the results of moldability evaluation, molded product density measurement, and 50%-strained compressive strength measurement.

TABLE 2

| | | | Examples | | | | | | | | | | | | | | |
|---|---|---|---|---|---|---|---|---|---|---|---|---|---|---|---|---|---|
| | | | 1 | 2 | 3 | 4 | 5 | 6 | 7 | 8 | 9 | 10 | 11 | 12 | 13 | 14 | 15 |
| Base Material Resin | Polypropylene resin A | Polypropylene resin A-1 | PBW | 60 | | | | 60 | 60 | 60 | 50 | 40 | 70 | 80 | 60 | 60 | 60 | |
| | | Polypropylene resin A-2 | PBW | | 60 | | | | | | | | | | | | | |
| | | Polypropylene resin A-3 | PBW | | | 60 | | | | | | | | | | | | |
| | | Polypropylene resin A-4 | PBW | | | | 60 | | | | | | | | | | | |
| | | Polypropylene resin A-5 | PBW | | | | | | | | | | | | | | | 60 |
| | | Polypropylene resin A-6 | PBW | | | | | | | | | | | | | | | |
| | | Polypropylene resin A-7 | PBW | | | | | | | | | | | | | | | |
| | | Polypropylene resin A-8 | PBW | | | | | | | | | | | | | | | |
| | Polypropylene resin B | Polypropylene resin B-1 | PBW | 40 | 40 | 40 | 40 | | | | 50 | | | | | | | |
| | | Polypropylene resin B-2 | PBW | | | | | 40 | | | | | | | | | | |
| | | Polypropylene resin B-3 | PBW | | | | | | 40 | | | | | | | | | |
| | | Polypropylene resin B-4 | PBW | | | | | | | 40 | | | | | | | | |
| | | Polypropylene resin B-5 | PBW | | | | | | | | | 60 | 30 | 20 | 40 | 40 | 40 | 40 |
| | Other polypropylene resin | Polypropylene resin C | PBW | | | | | | | | | | | | | | | |
| | Additive | Talc | PBW | 0.05 | 0.05 | 0.05 | 0.05 | 0.05 | 0.05 | 0.05 | 0.05 | 0.05 | 0.05 | 0.05 | 0.05 | 0.05 | 0.05 | 0.05 |
| | | Polyethylene glycol | PBW | 0.5 | 0.5 | 0.5 | 0.5 | 0.5 | 0.5 | 0.5 | 0.5 | 0.5 | 0.5 | 0.5 | 0.5 | 0.5 | 0.5 | 0.5 |
| | | Carbon black | PBW | | | | | | | | | | | | 6 | | | |
| | Physical property | Melting point | °C | 146 | 146 | 146 | 147 | 146 | 141 | 149 | 146 | 147 | 145 | 145 | 146 | 146 | 146 | 147 |
| First stage foaming | Foaming conditions | Amount of carbon dioxide | PBW | 7.5 | 7.5 | 7.5 | 7.5 | 7.5 | 7.5 | 7.5 | 7.5 | 7.5 | 7.5 | 7.5 | 7.5 | 7.5 | 7.5 | 7.5 |
| | | Foaming temperature | °C | 148 | 148 | 148 | 149 | 148 | 142 | 153 | 148 | 149 | 147 | 147 | 148 | 149 | 146 | 149 |
| | | Foaming pressure (gage pressure) | MPa | 3.3 | 3.3 | 3.3 | 3.3 | 3.3 | 3.3 | 3.3 | 3.3 | 3.3 | 3.3 | 3.3 | 3.3 | 3.3 | 3.3 | 3.3 |
| | Physical property | High-temperature heat quantity ratio | % | 22 | 22 | 21 | 21 | 22 | 22 | 20 | 22 | 21 | 22 | 21 | 22 | 16 | 27 | 21 |
| | | Average cell diameter | μm | 180 | 180 | 180 | 160 | 170 | 190 | 150 | 180 | 120 | 180 | 190 | 130 | 220 | 150 | 170 |
| | | Expansion ratio | Times | 19 | 20 | 19 | 19 | 19 | 20 | 18 | 19 | 14 | 20 | 20 | 21 | 23 | 15 | 20 |

TABLE 2-continued

| | | | Examples | | | | | | | | | | | | | | |
|---|---|---|---|---|---|---|---|---|---|---|---|---|---|---|---|---|---|
| | | | 1 | 2 | 3 | 4 | 5 | 6 | 7 | 8 | 9 | 10 | 11 | 12 | 13 | 14 | 15 |
| Second-stage foaming | Foaming conditions | Internal pressure (Absolute pressure) | MPa | — | — | — | — | — | — | — | — | 0.21 | — | — | — | — | — | — |
| | Physical property | High-temperature heat quantity ratio | % | — | — | — | — | — | — | — | — | 21 | — | — | — | — | — | — |
| | | Average cell diameter | μm | — | — | — | — | — | — | — | — | 170 | — | — | — | — | — | — |
| | | Expansion ratio | Times | — | — | — | — | — | — | — | — | 19 | — | — | — | — | — | — |
| In-mold expanded molded product | Moldability | Expanded particle internal pressure (Absolute pressure) | MPa | 0.2 | 0.2 | 0.2 | 0.2 | 0.2 | 0.2 | 0.2 | 0.2 | 0.2 | 0.2 | 0.2 | 0.2 | 0.2 | 0.2 | 0.2 |
| | | Minimum molding pressure (gage pressure) | MPa | 0.20 | 0.20 | 0.20 | 0.21 | 0.20 | 0.20 | 0.22 | 0.20 | 0.21 | 0.20 | 0.19 | 0.20 | 0.20 | 0.20 | 0.21 |
| | | Surface appearance | Surface part | E | E | E | E | E | E | G | E | E | E | E | E | E | E | E |
| | | | Edge part | E | E | E | E | E | E | G | E | E | E | E | E | E | E | E |
| | Physical property | Molded product density | g/L | 30 | 30 | 30 | 30 | 30 | 30 | 32 | 30 | 30 | 29 | 30 | 29 | 25 | 40 | 30 |
| | | 50%-strained compressive strength | MPa | 0.23 | 0.23 | 0.23 | 0.23 | 0.23 | 0.21 | 0.23 | 0.23 | 0.23 | 0.22 | 0.21 | .23 | 0.20 | 0.33 | 0.23 |
| | | 50%-strained compressive strength evaluation | — | A | A | A | A | A | B | B | A | A | A | B | A | A | A | A |

("PBW" stands for "Part by weight".)

TABLE 3

| | | | | Comparative Examples | | | | | | | | |
|---|---|---|---|---|---|---|---|---|---|---|---|---|
| | | | | 1 | 2 | 3 | 4 | 5 | 6 | 7 | 8 | 9 |
| Base material resin | Polypropylene resin A | Polypropylene resin A-1 | PBW | | | | 60 | | | | 100 | |
| | | Polypropylene resin A-2 | PBW | | | | | | | | | |
| | | Polypropylene resin A-3 | PBW | | | | | | | | | |
| | | Polypropylene resin A-4 | PBW | | | | | | | | | |
| | | Polypropylene resin A-5 | PBW | | | | | | | | | |
| | | Polypropylene resin A-6 | PBW | | 100 | | | 60 | | | | |
| | | Polypropylene resin A-7 | PBW | | | | | | 100 | 60 | | |
| | | Polypropylene resin A-8 | PBW | | | | | | | | | 90 |
| | Polypropylene resin B | Polypropylene resin B-1 | PBW | | | | 40 | | 40 | | | |
| | | Polypropylene resin B-2 | PBW | | | | | | | | | |
| | | Polypropylene resin B-3 | PBW | | | | | | | | | |
| | | Polypropylene resin B-4 | PBW | | | | | | | | | 10 |
| | | Polypropylene resin B-5 | PBW | 100 | | | | 40 | | | | |
| | Other polypropylene resin | Polypropylene resin C | PBW | | | 100 | | | | | | |
| | Additive | Talc | PBW | 0.05 | 0.05 | 0.05 | 0.05 | 0.05 | 0.05 | 0.05 | 0.05 | 0.005 |
| | | Polyethylene glycol | PBW | 0.5 | 0.5 | 0.5 | 0.5 | 0.5 | 0.5 | 0.5 | 0.5 | |
| | | Carbon black | PBW | | | | | | | | | |
| | Physical property | Melting point | °C. | 144 | 132 | 125 | 140 | 141 | 136 | 144 | 134 | 145 |
| First-stage foaming | Foaming conditions | Amount of carbon dioxide | PBW | 7.5 | 7.5 | 7.5 | 7.5 | 7.5 | 7.5 | 7.5 | 7.5 | 15 (Isobutane) |
| | | Foaming temperature | °C. | 146 | 132 | 128 | 143 | 143 | 139 | 146 | 136 | 142 |
| | | Foaming pressure (gage pressure) | MPa | 3.3 | 3.3 | 3.3 | 3.3 | 3.3 | 3.3 | 3.3 | 3.3 | 2.0 |
| | Physical property | High-temperature heat quantity ratio | % | 22 | 21 | 21 | 21 | 21 | 21 | 22 | 22 | 26 |
| | | Average cell diameter | μm | 130 | 145 | 130 | 180 | 180 | 210 | 190 | 140 | 350 |
| | | Expansion ratio | Times | 14 | 14 | 14 | 19 | 19 | 20 | 20 | 14 | 22 |
| Second-stage foaming | Foaming conditions | Internal pressure (Absolute pressure) | MPa | 0.21 | 0.21 | 0.21 | — | — | — | — | 0.21 | — |
| | Physical property | High-temperature heat quantity ratio | % | 22 | 21 | 21 | — | — | — | — | 22 | — |
| | | Average cell diameter | μm | 180 | 210 | 180 | — | — | — | — | 200 | — |
| | | Expansion ratio | Times | 19 | 20 | 19 | — | — | — | — | 20 | — |
| In-mold expanded molded product | Moldability | Expanded particle internal pressure (Absolute pressure) | MPa | 0.2 | 0.2 | 0.2 | 0.2 | 0.2 | 0.2 | 0.2 | 0.2 | 0.2 |
| | | Minimum molding pressure (gage pressure) | MPa | 0.26 | 0.16 | 0.14 | 0.20 | 0.20 | 0.23 | 0.24 | 0.18 | 0.20 |
| | | Surface appearance Surface part | — | E | G | G | E | E | E | E | E | E |
| | | Edge part | — | E | E | E | E | E | E | E | E | E |
| | Physical property | Molded product density | g/L | 30 | 30 | 30 | 30 | 30 | 30 | 30 | 30 | 30 |
| | | 50%-strained compressive strength | MPA | 0.23 | 0.19 | 0.18 | 0.20 | 0.20 | 0.20 | 0.22 | 0.20 | 0.20 |
| | | 50%-strained compressive strength evaluation | — | A | C | C | C | C | C | B | C | C |

("PBW" stands for "Part by weight".)

Comparisons between the molded products having substantially identical molded product densities indicate that (i) those in Examples can be molded with a low molding pressure and exhibit higher 50%-strained compressive strength and (ii) those in Comparative Examples exhibit decreased 50%-strained compressive strength with a low molding pressure and demand a higher molding pressure for high 50%-strained compressive strength.

Comparative Example 9

A polypropylene resin A-8 (which is an ethylene-propylene random copolymer), a polypropylene resin B-4 (which is a homopolypropylene), and talc were mixed in amounts shown in Table 3 with the use of a blender.

The mixture obtained was melted and kneaded at a resin temperature of 220° C. and extruded in a strand shape with the use of a twin-screw extruder (manufactured by O. N. Machinery Co., Ltd., TEK45). The strand thus extruded was water-cooled in a water tank having a length of 2 m, and was then cut. This resulted in polypropylene resin particles (1.3 mg per particle).

100 parts by weight of the polypropylene resin particles, 300 parts by weight of water, 3.0 parts by weight of tribasic calcium phosphate as a dispersing agent, and 0.075 parts by weight of sodium normal paraffin sulfonate were placed into a 10 L-pressure-resistant container. Then, while a resultant aqueous dispersion was stirred, 15 parts by weight of isobutane was added as a foaming agent, a temperature of a resultant mixture was raised to the foaming temperature shown in Table 3.

Then, gaseous isobutane was added so that the internal pressure of the container was adjusted to the foaming pressure shown in Table 3. Then, the temperature was retained for 30 min. Then, a valve at a lower part of the pressure-resistant container was opened while nitrogen gas was injected such that the temperature and the pressure in the container were retained. An aqueous dispersion medium was released from the valve into air under atmospheric pressure through an orifice plate having an opening diameter of 4 mmφ, so that expanded polypropylene resin particles having the high-temperature heat quantity ratio, the average cell diameter, and expansion ratio shown in Table 3 were obtained.

Subsequent production and evaluation of an in-mold expanded molded product were carried out as in Example 1. Table 3 shows the results of moldability evaluation, molded product density measurement, and 50%-strained compressive strength measurement.

In this case, while the minimum molding pressure was 0.20 MPa (gage pressure), 50%-strained compressive strength was 0.20 MPa which is lower than those in Examples.

Examples 16 and 17 and Comparative Examples 10 and 11

[Production of Composite Polypropylene Resin Particle]

As core layer base material resins, polypropylene resins and additives were mixed in amounts shown in Table 4 with the use of a blender so that mixtures serve as core layer base material resins.

Meanwhile, as a covering layer resin, (i) a polypropylene resin A-1 was prepared in Example 16, (ii) a polypropylene resin A-2 was prepared in Example 17, (iii) a polypropylene resin A-6 was prepared in Comparative Example 9, and (iv) a polypropylene resin A-1 was prepared in Comparative Example 10.

With the use of a 50 mm single-screw extruder (manufactured by Osaka Seiki Kousaku K. K., model: 20VSE-50-28), a mixture prepared as a core layer base material resin was melted and kneaded at a resin temperature of 220° C.

Meanwhile, with the use of a 30 mm twin-screw extruder (manufactured by Ikegai Corporation, PCM30), a mixture prepared as a covering layer resin was melted and kneaded at a resin temperature of 220° C.

On outlet sides of the 50 mm single-screw extruder and the 30 mm twin-screw extruder, a co-extrusion die was provided. The molten resins were supplied from the extruders to the die, so that the molten resins were joined in the die. Then, a multi-layer strand, in which the core layer base material resin was covered with the covering layer resin, was extruded. Note that a ratio of a discharge quantity of the core layer base material resin extruded from the 50 mm single-screw extruder to a discharge quantity of the covering layer resin extruded from the 30 mm twin-screw extruder was adjusted to 95/5.

The strand thus extruded was water-cooled in a water tank having a length of 2 m, and was then cut. This resulted in composite resin particles (1.2 mg per particle).

[Production of First-Stage Expanded Particles][Production of in-Mold Expanded Molded Product]

Subsequent production of first-stage expanded particles and of an in-mold expanded molded product was carried out as in Example 1 except the conditions shown in Table 4 were met. Table 4 shows the results of moldability evaluation, molded product density measurement, and 50%-strained compressive strength measurement. Note that expanded polypropylene resin particles were subjected to DSC measurement at a heating rate of 2° C./min. In each of Examples 16 and 17 and Comparative Examples 9 and 10 also, the DSC curve showed the total of two endothermic peaks which are (i) one main endothermic peak at 145° C. or lower and (ii) one high temperature peak on a high temperature-side of the main endothermic peak.

TABLE 4

| | | | | Examples | | Comparative Examples | |
|---|---|---|---|---|---|---|---|
| | | | | 16 | 17 | 10 | 11 |
| Base material resin | Polypropylene resin A | Polypropylene resin A-1 | PBW | 60 | | | |
| | | Polypropylene resin A-2 | PBW | | 60 | | |
| | | Polypropylene resin A-3 | PBW | | | | |
| | | Polypropylene resin A-4 | PBW | | | | |
| | | Polypropylene resin A-5 | PBW | | | | |
| | | Polypropylene resin A-6 | PBW | | | 60 | |
| | | Polypropylene resin A-7 | PBW | | | | |
| | Polypropylene resin B | Polypropylene resin B-1 | PBW | 40 | 40 | 40 | |
| | | Polypropylene resin B-2 | PBW | | | | |
| | | Polypropylene resin B-3 | PBW | | | | |
| | | Polypropylene resin B-4 | PBW | | | | |
| | | Polypropylene resin B-5 | PBW | | | | 100 |
| | Other polypropylene resin | Polypropylene resin C | PBW | | | | |
| | Additive | Talc | PBW | 0.05 | 0.05 | 0.05 | 0.05 |
| | | Polyethylene glycol | PBW | 0.5 | 0.5 | 0.5 | 0.5 |
| | | Carbon black | PBW | | | | |
| | Physical property | Melting point | ° C. | 146 | 146 | 141 | 144 |
| Covering layer resin | Polypropylene resin | | | Polypropylene resin A-1 | Polypropylene resin A-2 | Polypropylene resin A-6 | Polypropylene resin A-1 |
| First-stage foaming | Foaming conditions | Amount of carbon dioxide | PBW | 7.5 | 7.5 | 7.5 | 7.5 |
| | | Foaming temperature | ° C. | 148 | 148 | 143 | 146 |
| | | Foaming pressure (gage pressure) | MPa | 3.3 | 3.3 | 3.3 | 3.3 |
| | Physical property | High-temperature heat quantity ratio | % | 22 | 22 | 21 | 22 |
| | | Average cell diameter | μm | 180 | 180 | 180 | 180 |
| | | Expansion ratio | Times | 19 | 19 | 19 | 19 |
| In-mold expanded molded | Moldability | Expanded particle internal pressure (Absolute pressure) | MPa | 0.2 | 0.2 | 0.2 | 0.2 |

TABLE 4-continued

|  |  |  | Examples | | Comparative Examples | |
|---|---|---|---|---|---|---|
|  |  |  | 16 | 17 | 10 | 11 |
| product |  Minimum molding pressure (gage pressure) | MPa | 0.19 | 0.19 | 0.19 | 0.25 |
|  | Surface appearance — Surface part | — | E | E | E | E |
|  | Edge part | — | E | E | E | E |
| Physical property | Molded product density | g/L | 30 | 30 | 30 | 30 |
|  | 50%-strained compressive strength | MPa | 0.23 | 0.23 | 0.20 | 0.23 |
|  | 50%-strained compressive strength evaluation | — | A | A | C | A |

("PBW" stands for "Part by weight".)

Note that observation, by a microscope, of cleaved surfaces of molded products whose fusibility was evaluated as "excellent" in fusibility evaluation confirmed that in Comparative Example 11, (i) expanded composite particle interfaces (interfaces between the expanded composite particles) were not cleaved and (ii) the percentage of clefts in the expanded composite particles was 80% or more. However, it was also confirmed that the expanded polypropylene resin core layer and the polypropylene resin covering layer were partially peeled from each other at the interface. Meanwhile, in Example 16, Example 17, and Comparative Example 10, peeling of an expanded polypropylene resin core layer and a polypropylene resin covering layer from each other at an interface therebetween in each of expanded composite particles was hardly confirmed.

Any of a comparison between Example 1 and Example 16 and a comparison between Example 2 and Example 17 indicates that expanded composite particles may be molded with a low molding pressure. Any of a comparison between Example 16 and Comparative Example 10 and a comparison between Example 17 and Comparative Example 10 indicates that one or more embodiments of the present invention may be molded with a low molding pressure and exhibits high 50%-strained compressive strength. A comparison of Example 16 or Example 17 with Comparative Example 11 indicates that adhesiveness of an interface between an expanded polypropylene resin core layer and a polypropylene resin covering layer is increased in each expanded composite particle.

One or more embodiments of the present invention can be used for various purposes such as automobile interior materials, automobile bumper core materials, heat insulating materials, shock-absorbing packing materials, and returnable containers.

REFERENCE SIGNS LIST $t_m$: Melting peak temperature of polypropylene resin (or base material resin) in DSC curve of second temperature rise Point A: Heat absorption quantity of expanded polypropylene resin particles at 80° C. in DSC curve of first temperature rise Point B: Heat absorption quantity of expanded polypropylene resin particles at temperature at which melting on high temperature side ends in DSC curve of first temperature rise Point C: Point at which heat absorption quantity of expanded polypropylene resin particles becomes small between two melting heat quantity regions in DSC curve of first temperature rise, the two melting heat quantity regions being region of low temperature-side melting heat quantity and region of high temperature-side melting heat quantity Point D: Point at which line segment A-B intersects line that is drawn so as to extend, parallel to Y-axis, from point C toward line segment A-B in DSC curve of first temperature rise of expanded polypropylene resin particles Qh: High temperature-side melting heat quantity of expanded polypropylene resin particles in DSC curve of first temperature rise Ql: Low temperature-side melting heat quantity of expanded polypropylene resin particles in DSC curve of first temperature rise Although the disclosure has been described with respect to only a limited number of embodiments, those skilled in the art, having benefit of this disclosure, will appreciate that various other embodiments may be devised without departing from the scope of the present invention. Accordingly, the scope of the present invention should be limited only by the attached claims.

What is claimed is:

1. A method of producing a polypropylene resin in-mold expanded molded product, comprising:
    placing polypropylene resin particles, water, and an inorganic gas foaming agent in a pressure-resistant container, forming a mixture,
    wherein the polypropylene resin particles comprise a core layer and a covering layer,
    wherein the core layer is obtained from a base material resin having a melting point of 140° C. to 150° C., the base material resin comprising:
        a polypropylene resin A comprising 3 weight % to 15 weight % of 1-butene and having a melting point of 130° C. to 140° C.; and
        a polypropylene resin B having a melting point of 145° C. to 165° C., and
    wherein the covering layer consists of the polypropylene resin A,
    dispersing the polypropylene resin particles while stirring the mixture, obtaining a dispersion liquid,
    increasing a temperature and a pressure in the pressure-resistant container,
    releasing the dispersion liquid from the pressure-resistant container into a region having a pressure lower than the pressure in the pressure-resistant container, producing expanded polypropylene resin particles each having an average cell diameter of 100 μm to 340 μm
    wherein the expanded polypropylene resin particles are each an expanded composite particle comprising the core layer and the covering layer, the core layer being covered with the covering layer; and obtaining the polypropylene resin in-mold expanded molded product by filling a mold with the expanded polypropylene resin particles, and then heating the expanded polypropylene resin particles, wherein the polypropylene resin in-mold expanded molded product has a density and a 50%-strained compressive strength satisfying the following:

$$[50\%\text{-strained compressive strength (MPa)}] \geq 0.0069 \times [\text{Molded product density (g/L)}] + 0.018.$$

2. The method according to claim 1, wherein the polypropylene resin A comprises 2 weight % to 10 weight % of ethylene.

3. The method according to claim 1, wherein the inorganic gas foaming agent contains carbon dioxide.

4. The method according to claim 1, further comprising:
melting and kneading the polypropylene resin A and the polypropylene resin B in an extruder and obtaining the polypropylene resin particles.

5. The method according to claim 1, further comprising:
obtaining the polypropylene resin A by polymerization using a Ziegler catalyst.

6. The method according to claim 1, wherein the expanded polypropylene resin particles are heated with steam having a pressure of 0.22 MPa (gauge pressure) or less.

* * * * *